(12) United States Patent
Giering et al.

(10) Patent No.: US 12,510,511 B2
(45) Date of Patent: Dec. 30, 2025

(54) TESTING THE COERCIVITY OF MAGNETIC PIGMENTS

(71) Applicant: GIESECKE+DEVRIENT CURRENCY TECHNOLOGY GMBH, Munich (DE)

(72) Inventors: Thomas Giering, Kirchseeon (DE); Joachim Ewald, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 95 days.

(21) Appl. No.: 17/608,659

(22) PCT Filed: May 13, 2020

(86) PCT No.: PCT/EP2020/025220
§ 371 (c)(1),
(2) Date: Nov. 3, 2021

(87) PCT Pub. No.: WO2020/228989
PCT Pub. Date: Nov. 19, 2020

(65) Prior Publication Data
US 2022/0221427 A1  Jul. 14, 2022

(30) Foreign Application Priority Data
May 16, 2019 (DE) ...................... 10 2019 003 491.0

(51) Int. Cl.
*G01N 27/72* (2006.01)
*B42D 25/369* (2014.01)
(Continued)

(52) U.S. Cl.
CPC ........... *G01N 27/72* (2013.01); *B42D 25/369* (2014.10); *H01F 13/00* (2013.01); *B42D 25/305* (2014.10)

(58) Field of Classification Search
None
See application file for complete search history.

(56) References Cited

U.S. PATENT DOCUMENTS 6,232,774 B1 * 5/2001 Kimura ................. G01N 27/82
324/240
8,544,630 B2  10/2013 Schutzmann et al.
(Continued)

FOREIGN PATENT DOCUMENTS

DE  3037932 A1  4/1982
DE  102004049999 A1  4/2006
(Continued)

OTHER PUBLICATIONS

Meisenberg Armin et al.; Measuring Apparatus for Measuring Magnetic Properties, and Method for Producing Such a Measuring Apparatus; Date Published Jan. 21, 2010; WO 2010006801 A1; Meas Deutschland GMBH [DE]; CPC G 07 D 7/04 (Year: 2010).*
(Continued)

*Primary Examiner* — Nasima Monsur
(74) *Attorney, Agent, or Firm* — Workman Nydegger

(57) ABSTRACT

A method for checking the coercive field strength of magnetic pigments of an areal sample which are contained in a magnetic region of the areal sample includes: after a magnetization of the areal sample until saturation, a first partial counter-magnetization of the magnetic pigments out by a magnetizing device, and a first measurement of a first magnetization value of the partially counter-magnetized magnetic pigments are carried out. The measured magnetization values are transmitted from the measuring device to a checking device. The checking device checks the magnetization values of the partially counter-magnetized magnetic pigments for ascertaining a check result that relates to the coercive field strength of the magnetic pigments and trans-
(Continued)

mits the check result relating to the coercive field strength to an output device connected to the checking device.

19 Claims, 6 Drawing Sheets

(51) Int. Cl.
  *H01F 13/00* (2006.01)
  *B42D 25/305* (2014.01)

(56) References Cited

U.S. PATENT DOCUMENTS

| | | | |
|---|---|---|---|
| 8,544,893 | B2 | 10/2013 | Schuetzmann et al. |
| 9,248,637 | B2* | 2/2016 | Bargir .................... B42D 25/00 |
| 9,703,994 | B2 | 7/2017 | Paul et al. |
| 10,002,267 | B2 | 6/2018 | Schutzmann et al. |
| 10,222,431 | B2 | 3/2019 | Bartos et al. |
| 2003/0233889 | A1* | 12/2003 | Nakane ................... G01L 3/104 |
| | | | 73/862.331 |
| 2008/0169892 | A1* | 7/2008 | Komura ................ H01F 41/028 |
| | | | 335/284 |
| 2009/0008922 | A1 | 1/2009 | Schutzmann et al. |
| 2012/0160632 | A1* | 6/2012 | Schutzmann ............ G07D 7/04 |
| | | | 194/302 |
| 2013/0029112 | A1* | 1/2013 | Bargir .................. B42D 25/355 |
| | | | 347/110 |
| 2014/0367469 | A1 | 12/2014 | Schutzmann |
| 2016/0055358 | A1 | 2/2016 | Paul et al. |
| 2017/0003358 | A1* | 1/2017 | Ueyama .................. G01R 33/12 |
| 2017/0350948 | A1 | 12/2017 | Bartos et al. |
| 2018/0306601 | A1* | 10/2018 | Becker ..................... G01D 5/12 |

FOREIGN PATENT DOCUMENTS

| | | |
|---|---|---|
| DE | 102009039588 A1 | 3/2011 |
| DE | 102011120972 A1 | 6/2013 |
| DE | 102013205891 A1 | 10/2014 |
| DE | 102015002219 A1 | 8/2016 |

OTHER PUBLICATIONS

Berner Georg et al.; Promotion System; DE 102015222677 A1; May 18, 2017; CPC H 02 K 41/025 (Year: 2017).*
International Search Report and Written Opinion from PCT Application No. PCT/EP2020/025220, Sep. 24, 2020.
German Search Report from corresponding DE Application No. 102019003491.0, Apr. 17, 2020.

* cited by examiner

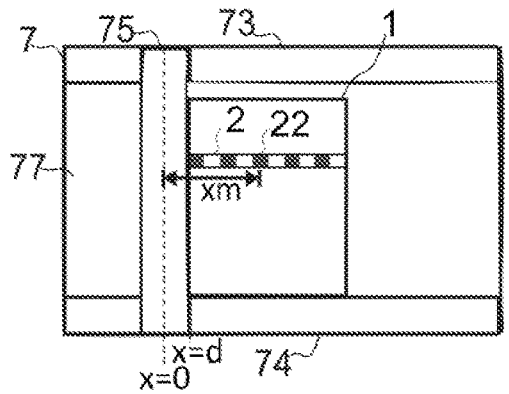
Fig. 6a
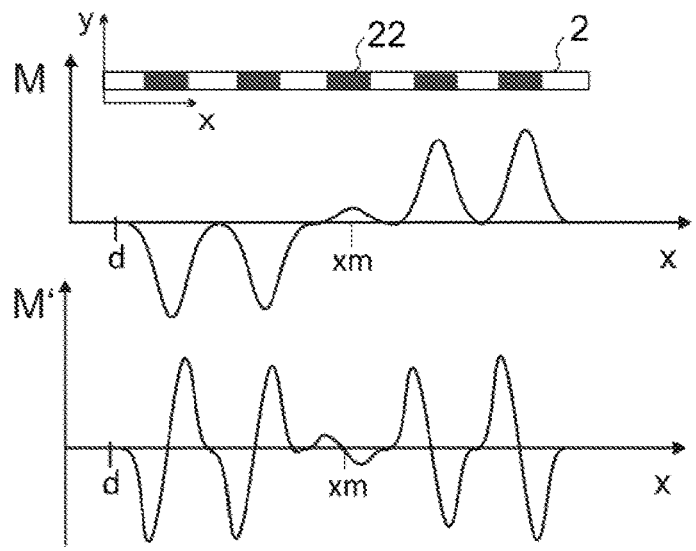
Fig. 6b
Fig. 6c
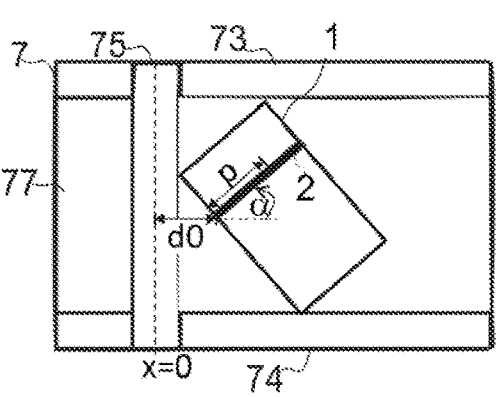
Fig. 6d
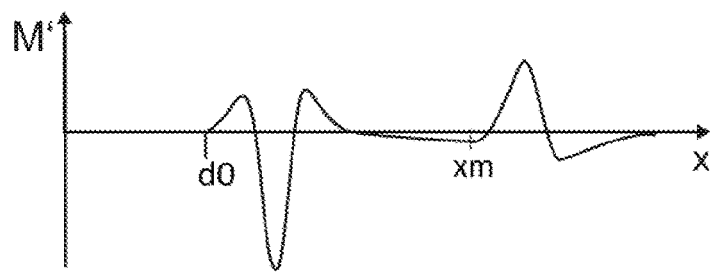
Fig. 6e

TESTING THE COERCIVITY OF MAGNETIC PIGMENTS

BACKGROUND

The invention relates to checking the coercive field strength of magnetic pigments of areal, such as sheet-shaped, samples, in particular of security documents, such as identity cards, or of value documents, such as banknotes, cheques, cards, tickets, coupons.

From the prior art it is known to equip security documents or value documents with security elements, such as security strips or also security threads, which contain magnetic pigments. The magnetic pigments can be applied to the security element either throughout or only in certain regions, for example in the form of a coding. For the magnetic coding of a security element there is used for example a particular sequence of magnetic and non-magnetic regions, which is characteristic of the value document. Moreover, it is known to use different magnetic pigments for a magnetic coding, e.g. differently coercive magnetic pigments are employed, from which low-coercive and high-coercive magnetic regions are formed which are arranged on the security element. However, there are also known magnetic security elements for which magnetic pigments, where applicable in a mixture with other pigments, are printed onto the documents.

It is further known to check magnetic security elements by machine. For this, the value documents having a magnetic security element for their magnetization are exposed to a magnetic field or successively to two magnetic fields of different directions. The resulting magnetization is checked by one or several magnetic detectors in order to check the authenticity or the type of the value document.

When manufacturing value documents that have magnetic security elements, it may be necessary to check the coercive field strength of the magnetic pigments applied to the value document. This is to ensure, among other things, that the respective magnetic security element has the coercive field strength specified for the respective magnetic pigment. Usually, elaborate coercimeters are used to check the coercive field strength, in which the magnetic field strength is variably adjustable with the help of an electromagnet. Or apparatuses are used in which the values range of the coercive field strength to be checked is very limited. It is also often necessary to destroy the item to be checked in order to measure its coercive field strength.

SUMMARY

The invention is therefore based on the object of proposing a possibility in which the coercive field strength of magnetic pigments can be checked in a simple manner and over a wide values range.

This object is achieved by the subject matters of the independent claims. Claims dependent thereon state advantageous developments and embodiments of the invention.

The invention relates to a method and an apparatus for checking the coercive field strength of magnetic pigments of flat, such as sheet-shaped, samples, in particular of security documents. In the following, for simplicity's sake, instead of "areal sample" there is often used only the term "sample". For checking the coercive field strength of magnetic pigments of an areal sample which are contained in a magnetic region of the areal sample, the following steps are carried out:

a) providing a magnetizing device with at least one magnet, preferably at least one permanent magnet which provides a static magnetic field for magnetizing the magnetic pigments, and providing a checking device connected to the measuring device, which is arranged to ascertain a check result which relates to the coercive field strength of the magnetic pigments, b) magnetizing the areal sample by the static magnetic field of the magnet of the magnetizing device or by a static magnetic field of another magnetizing device in such a way that the magnetic pigments of the areal sample are magnetized in a magnetizing direction until the saturation of their magnetization, c) where applicable, measuring the remanence of the magnetization of the magnetized magnetic pigments after their magnetization with a measuring device, wherein the magnetic pigments are located outside the static magnetic field of the at least one magnet during the remanence measurement, d) first partial counter-magnetization of the magnetic pigments by the static magnetic field of the magnet of the magnetizing device in such a way that the magnetic pigments are partially counter-magnetized by the static magnetic field, wherein for the first partial counter-magnetization the areal sample and the magnet are moved relative to each other toward each other until the magnetic pigments are positioned at a first magnetization distance from the magnet in the static magnetic field, at which the static magnetic field has a first magnetization field strength, e) first measurement of a first magnetization value of the partially counter-magnetized magnetic pigments with one/the measuring device, wherein the magnetic pigments are located outside the static magnetic field of the magnetizing device during the first measurement, f) where applicable, repeating the magnetization according to step b) and subsequently, where applicable, a renewed partial counter-magnetization according to step d) and renewed measurement according to step e) for measuring a further magnetization value, wherein upon the renewed partial counter-magnetization in the respective step d), for the partial counter-magnetization the sample by the static magnetic field, the areal sample and the magnet are moved relative to each other toward each other until the magnetic pigments are positioned at a further magnetization distance from the at least one magnet in the static magnetic field, at which the magnetic field strength is greater or smaller than the first magnetization field strength present at the first magnetization distance, and wherein the magnetic pigments are located outside the static magnetic field of the at least one magnet during the measurement of the respective further magnetization value, g) transmitting the first magnetization value measured in the first measurement and, where applicable, the further magnetization value(s) of the partially counter-magnetized magnetic pigments measured in the further measurement(s) according to step f) from the measuring device to the checking device connected to the measuring device, in which checking device a magnetic field course of the magnetizing device is stored or which is connected to another device in which a magnetic field course of the magnetizing device is stored, h) checking the first and, where applicable, the further magnetization value(s) of the partially counter-magnetized magnetic pigments by means of the checking device for ascertaining the check result which relates to the coercive field strength of the magnetic pigments, i) transmitting the check result relating to the coercive field strength from the checking device to an output device connected to the checking device and outputting the check result relating to the coercive field strength of the magnetic pigments by the output device.

The stored magnetic field course indicates the magnetic field strength of the static magnetic field of the magnetizing device as a function of the magnetization distance of the magnetic pigments from the at least one magnet. The magnetic field course may here be stored as a continuous function or in the form of several discrete values. The checking device can use the magnetic field course of the magnetizing device to ascertain the check result which relates to the coercive field strength. Additionally or alternatively, the checking device may use the magnetic field course of the magnetizing device to ascertain the first magnetization distance and/or, where applicable, the at least one further magnetization distance, which is to be chosen between the magnetic pigments and the magnet for the first and/or, where applicable, renewed partial counter-magnetization. It can then transmit the respective first/further magnetization distance to the output device connected to the checking device, which output device is arranged to output the respective first/further magnetization distance for an operator.

After the magnetization, the areal sample is removed from the static magnetic field of the magnetizing device. Immediately before the first and, where applicable, the renewed partial counter-magnetization according to step d), the areal sample is not positioned in the static magnetic field of the magnetizing device. For the first partial counter-magnetization and, where applicable, the renewed partial counter-magnetization, the areal sample can be moved toward the magnet or the magnet can be moved toward the areal sample in order to position the magnetic pigments at the first magnetization distance or at the further magnetization distance from the magnet in the static magnetic field. For example, for the first partial counter-magnetization, and where applicable the renewed partial counter-magnetization according to step d), the areal sample is placed on a magnetizing area of the magnetizing device and moved along the magnetizing area of the magnetizing device in the direction toward the magnet of the magnetizing device (in the direction of the magnetic field gradient) and subsequently moved away from the magnet of the magnetizing device (opposite to the magnetic field gradient). Moving the sample while the at least one magnet remains stationary has the advantage that the fastening of the magnet is space-saving and cost-effective. If, alternatively, the at least one magnet is designed to be movable (while the sample for the partial counter-magnetization remains stationary or is moved respectively completely through the magnetizing device), there can be achieved—by shifting the magnet position—both very high and very low magnetization field strengths for the partial counter-magnetization. In addition, the position of the at least one magnet can be more finely adjusted and more easily read than the position of the sample or of the magnetic pigments on the sample.

For the first partial counter-magnetization, and where applicable for the renewed partial counter-magnetization, the areal sample is brought into the static magnetic field in such a way that the static magnetic field is directed at least approximately opposite to the magnetization direction of the magnetic pigments of the areal sample. Since the magnetization direction is a property of the magnetic pigments, the orientation of the areal sample and the magnetization distance of the areal sample from the magnet are chosen accordingly so that the static magnetic field is directed opposite to the magnetization direction of the magnetic pigments of the areal sample. The magnetization resulting after the partial counter-magnetization can be directed in or opposite to the magnetization direction. The amount of magnetization achieved after the partial counter-magnetization can be e.g. 0% or 10% (or other portions from 0% to 100%) of the remanent magnetization achieved upon the magnetization. If, for example, counter-magnetization is carried out exactly with the coercive field strength, the magnetization achieved is vanishingly small (corresponding to 0% of the remanent magnetization).

The partial counter-magnetization of step d) and the measurement of step e) for measuring the further magnetization value are in some cases repeated or carried out anew at least once according to step f) so that at least one further magnetization value is obtained. In particular, the partial counter-magnetization of step d) and the measurement of step e) for measuring the further magnetization value are repeated or carried out again at least twice according to step f) and here the further magnetization distance is varied, so that at least two further magnetization values are obtained at at least two further magnetization distances. This renewed or repeated measurement makes it possible to check the coercive field strength of the magnetic pigments with the aid of several magnetization values, even for short magnetic regions.

In some embodiment examples, the areal sample has at least one long magnetic region in which the magnetic pigments are present, which is at least 1 cm long, preferably at least 2 cm long, at least along its direction of extension. Over this long magnetic region, the magnetic pigments are preferably distributed substantially homogeneously, at least in certain portions. The direction of extension can be, for example, the longitudinal direction but also any other direction of the magnetic region in which it has a great length. For the first and, where applicable, for the renewed partial counter-magnetization, the areal sample is preferably positioned on the magnetizing device in such a way that the direction of extension of the long magnetic region is directed parallel, antiparallel or oblique to the magnetic field gradient of the static magnetic field, i.e. along the distance coordinate of the deposited magnetic field course, but not perpendicular to the magnetic field gradient of the static magnetic field. As a result of the orientation of the long magnetic region parallel, antiparallel or oblique to the magnetic field gradient, the magnetic pigments located in different portions of the long magnetic region are counter-magnetized to different degrees (the portions located closer to the magnet during counter-magnetization more strongly than the portions located further away).

In these embodiment examples, the measuring device is preferably arranged to measure the magnetization as a function of the direction of extension of the magnetic pigments on the sample. For example, the measuring device is arranged to generate already in the first measurement (after the first partial counter-magnetization) both a first magnetization value $M(x0)$ (in a first portion of the long magnetic region which lies in the first magnetization distance $x0$) and—without renewed partial counter-magnetization—one or more further magnetization values $M(x1)$, $M(x2)$, ... which are measured in other portions of the long magnetic region. The other portions, in the first partial counter-magnetization, were positioned at further magnetization distances $x1, x2, ...$ from the at least one magnet in the static magnetic field, at which the magnetic field strength of the static magnetic field is greater or smaller than in the first magnetization distance x0. Since a renewed partial counter-magnetization and a renewed measurement of the sample are then not necessary, a particularly fast check of the coercive field strength is made possible.

In these embodiment examples, the checking device is preferably arranged to ascertain, with the aid of at least two further magnetization values M(x1), M(x2), . . . of the magnetic pigments measured for various further magnetization distances x1, x2, . . . and/or with the aid of the first magnetization value M(x0) measured for the first magnetization distance x0 and at least one further magnetization value M(x1) measured for a further magnetization distance x1, a magnetization course M(x) as a function of the magnetization distance x and to analyse the magnetization course M(x) in order to determine a target magnetization distance xm at which the coercive field strength of the magnetic pigments was achieved in the first partial counter-magnetization. When analyzing the magnetization course M(x), as a target magnetization distance xm there is chosen e.g. that magnetization distance at which the magnetization M(x) as a function of the magnetization distance x or its first derivative M'(x)=dM(x)/dx as a function of the magnetization distance x has a zero crossing (M(xm)=0) or takes a minimum or at which a standard deviation SM(x) of the magnetization M(x) has a minimum modulation (standard deviation of the magnetization measured at different y-positions but at the same x position), e.g. in the case of magnetic serial numbers.

From the target magnetization distance xm, the checking device can determine the coercive field strength Km of the magnetic pigments with the aid of the magnetic field course K(x), e.g. by inserting the target magnetization distance xm into the function K(x). The coercive field strength Km of the magnetic pigments is then transmitted from the checking device to the output device, which is arranged to output the coercive field strength Km of the magnetic pigments for an operator. A determination and output of the coercive field strength (as opposed to simply confirming or denying a specified coercive field strength) allows the operator to more accurately analyse the sample, e.g. classification, quantitative quality control or error analysis.

The invention also relates to an apparatus for checking the coercive field strength with the above-mentioned measuring device and the above-mentioned checking device, i.e. without the above-mentioned magnetizing device, which is provided separately therefrom. The measuring device and checking device can be separate units or can reside together in one unit, e.g. in the same housing. The apparatus may also have an input device connected to the checking device and/or the output device connected to the checking device.

The measuring device is arranged to carry out the first and, where applicable, the respective further measurement such that during the first measurement and, where applicable, during the respective further measurement the magnetic pigments are not located in a magnetic field suitable for magnetizing the magnetic pigments, in particular are located outside the static magnetic field of the magnetizing device, i.e. so far away from it that the magnetic field strength of the magnetizing device at the place of the measurement is negligibly low. Preferably, the measuring device has a receiving means for receiving the areal sample, which is positioned such that during the first and possibly the at least one further measurement the areal sample is not located in a magnetic field suitable for magnetizing the magnetic pigments, in particular outside the static magnetic field of the magnetizing device. During the first measurement and, where applicable, during the further measurement(s), the magnetic pigments are preferably not located in a magnetic field suitable for their magnetization, i.e. at most in a very weak magnetic field (e.g. the earth's magnetic field) which can change the magnetization of the magnetic pigments by less than 1%.

The measuring device is arranged to carry out a first measurement of a first magnetization value of the magnetic pigments which are partially counter-magnetized by the first magnetization field strength after the first partial counter-magnetization, and where applicable at least one further measurement for measuring at least one further magnetization value of the magnetic pigments which are partially counter-magnetized in a renewed partial counter-magnetization carried out where applicable, when these magnetic pigments are partially counter-magnetized with a further magnetization field strength opposite to the magnetization direction, which is greater or smaller than the first magnetization field strength with which the magnetic pigments were counter-magnetized at the first magnetization distance. The measuring device is arranged to transmit the at least one first or further magnetization value of the partially counter-magnetized magnetic pigments measured in the first measurement and, where applicable, the at least one further measurement to the checking device.

Where applicable, the operator can also specify one or several regions of interest (ROI) in which the to-be-checked magnetic pigments of the respective areal sample are located. The measuring device can then limit the measurement of the magnetization to this ROI. The checking device may be arranged to choose, with the aid of information about the ROI on the sample, the magnetization values measured by the measuring device, which are used to determine the check result relating to the coercive field strength of the magnetic pigments. The checking device selects e.g. one or several particular magnetization values of the ROI or averages the magnetization values over the ROI.

The checking device is arranged to check the first and, where applicable, the further magnetization value(s) of the partially counter-magnetized magnetic pigments for ascertaining a check result which relates to the coercive field strength of the magnetic pigments and to transmit the check result relating to the coercive field strength of the magnetic pigments to the output device connected to the checking device. The checking device e.g. is programmed with appropriate software, with the help of which it can ascertain the check result relating to the coercive field strength of the magnetic pigments. Preferably, a magnetic field course K(x) of the magnetizing device is stored in the checking device. Alternatively, the checking device can also be connected to another device in which a magnetic field course K(x) of the magnetizing device is stored. In particular, the checking device has a memory region in which a magnetic field course K(x) of the magnetizing device as a function of the distance from the magnet of the magnetizing device (as a function of the magnetization distance x of the magnetic pigments) is stored. The magnetic field course K(x) may have been determined empirically with the help of a corresponding measuring device or calculated by mathematical simulation or determined empirically with the aid of magnetic items with known coercive field strength, prior to the check.

Where applicable, a correction of the magnetic field course K(x) obtained in this way can be carried out on the basis of a calibration measurement of a corresponding calibration medium, which —analogous to the areal sample—is first magnetized, then counter-magnetized by means of the magnetizing device and then measured with the help of the measuring device. The calibration medium e.g. is configured to be areal and has one long (at least 1 cm long, preferably at least 2 cm long) or preferably several long magnetic regions (at least 1 cm long, preferably at least 2 cm long), which respectively throughout have magnetic pigments of a particular coercive field strength and are spatially separated from one another on the calibration medium, the coercive field strength of the various long magnetic regions being chosen respectively differently. Upon the partial counter-magnetization, the calibration medium is positioned on the magnetizing device such that the long magnetic regions extend parallel, antiparallel or obliquely to the magnetic field gradient of the static magnetic field. Such a design of the calibration medium enables a calibration of the magnetic field course $K(x)$ with the help of one single measurement, analogous to the measurement of a sample having one long magnetic region. The calibration medium can also be used for a comparative measurement in which the calibration medium and the areal sample (which has magnetic pigments of an unknown coercive field strength) are fastened to each other, in one step counter-magnetized with the magnetizing device and in one step measured by means of the measuring device, whereby both a magnetization course of the areal sample $M(x)$ and a magnetization course of the calibration medium are measured. The coercive field strength of the areal sample can then be checked by comparing the measured magnetization courses.

In particular, the checking device is arranged for
using the magnetic field course $K(x)$ of the magnetizing device to ascertain the check result relating to the coercive field strength of the magnetic pigments, and/or
using the magnetic field course $K(x)$ of the magnetizing device to ascertain a magnetization distance which is to be chosen between the magnetic pigments and the magnet for the first and/or, where applicable, the renewed partial counter-magnetization and to transmit this first/further magnetization distance to the output device.

The checking device may be arranged to receive, from an input device connected to the checking device or via an interface connected to the checking device, an operator's specification which relates to a requested coercive field strength to be verified with the checking device and/or to an indication of a requested coercivity region including the requested coercive field strength (e.g. a tolerance around the requested coercive field strength). Based on the operator's specification, the checking device can then ascertain, with the aid of the magnetic field course $K(x)$ of the magnetizing device, the first magnetization distance which is to be chosen between the magnetic pigments and the magnet for the first partial counter-magnetization. The checking device can then transmit the first magnetization distance to the output device connected to the checking device, which output device is arranged to output the respective first magnetization distance for an operator of the magnetizing device, e.g. to visually display it to the operator or to output it acoustically. This embodiment allows a particularly simple check of a specified requested coercive field strength, for example for the quality control of security documents or for checking the authenticity thereof.

In some embodiment examples, the check result ascertained upon checking, which relates to the coercive field strength of the magnetic pigments, comprises a confirmation (or a denial) of whether the magnetic pigments have a specified requested coercive field strength or whether their coercive field strength is within the requested coercivity region including the requested coercive field strength.

In some embodiment examples, the checking device is arranged to check, when checking the first magnetization value of the partially counter-magnetized magnetic pigments, whether the first magnetization value corresponds to a magnetization of zero or is in a magnetization acceptance region being around a magnetization of zero. According to the hysteresis curve of the magnetic pigments, the acceptance region corresponds to the requested coercivity region (which includes the requested coercive field strength). If yes, the checking device transmits the confirmation that the magnetic pigments have the specified requested coercive field strength or that the coercive field strength of the magnetic pigments is within the specified requested coercivity region to the output device. If no, a corresponding denial is transmitted. Where applicable, a prompt is output to the operator at the output device for a renewed partial counter-magnetization and for a renewed measurement to measure at least one further magnetization value. When the checking device automatically chooses the further magnetization distance, this is also output to the operator. Alternatively, the operator may also choose a further magnetization distance chosen by the operator and input it at an input device or via an interface.

In some embodiment examples, the checking device is arranged to receive from an input device or interface an operator's specification which relates to a coercivity region to be examined with the checking device, and to ascertain on the basis of the operator's specification, with the aid of the magnetic field course $K(x)$ of the magnetizing device, the first and at least one (preferably several) further magnetization distance which is to be chosen between the magnetic pigments and the magnet for the renewed partial counter-magnetization. The checking device transmits the respective first or further magnetization distance to the output device connected to the checking device, which output device is arranged to output the respective first or further magnetization distance for an operator of the magnetizing device. The operator's specification which relates to a coercivity region to be examined with the checking device contains e.g. the coercivity region itself and, where applicable, additionally a step size for the coercive field strength or a number of check steps in the coercivity region. In particular, the checking device is arranged to choose one or more coercive field strengths which lie within the coercivity region specified by the operator and to insert these into the magnetic field course $K(x)$ in order to determine the further magnetization distances x1, x2. There are chosen e.g. the upper and lower limit of the coercivity region and, where applicable, coercive field strengths lying in between. The checking device can choose these equidistantly or automatically according to the specified number or step size for the coercive field strength. This procedure enables an accelerated measurement when the coercive field strength of the sample is approximately known.

In some embodiment examples, the check result ascertained upon checking, which relates to the coercive field strength of the magnetic pigments, comprises a value for the coercive field strength of the magnetic pigments (and where applicable also an indication of accuracy relating thereto).

The checking device can be arranged to approximately determine or estimate the actual coercive field strength of the magnetic pigments with the aid of the first magnetization value and, where applicable, at least one of the further magnetization values, with the aid of a look-up table which indicates discrete values for the magnetic field course $K(x)$ as a function of the magnetization distance x, e.g. by ascertaining the smallest measured magnetization value and looking up the associated coercive field strength or an associated coercivity region in the look-up table.

Alternatively or additionally, the checking device can be arranged to determine, with the aid of at least two of the further magnetization values or with the aid of the first magnetization value and at least one of the further magnetization values, a target magnetization distance xm at which the magnetization as a function of the magnetization distance has a zero crossing or at least assumes a minimum (and is vanishingly small here). From the target magnetization distance xm, the checking device can determine the coercive field strength of the magnetic pigments with the aid of the magnetic field course K(x), e.g. by inserting the target magnetization distance xm into the function K(x). The checking device then transmits the coercive field strength of the magnetic pigments to the output device connected to the checking device, which output device is arranged to output the coercive field strength of the magnetic pigments for an operator, e.g. a numerical value of the coercive field strength, where applicable with an indication of accuracy.

In order to determine the target magnetization distance at which the magnetization as a function of the magnetization distance has its zero crossing, the checking device can be arranged to ascertain a magnetization course M(x) as a function of the magnetization distance with the aid of the further magnetization value(s) and, where applicable, with the aid of the first magnetization value, and to automatically analyse the magnetization course. It can transmit the magnetization course M(x) to the output device which is arranged to output, e.g. display, the magnetization course M(x) for the operator for further analysis.

For example, the checking device can be arranged to determine the target magnetization distance, at which the magnetization M(x) as a function of the magnetization distance x has a zero crossing (M(xm)=0), by fitting or extrapolating or interpolating the first magnetization value and at least one of the further magnetization values, or by fitting or extrapolating or interpolating at least two of the further magnetization values. Two or more magnetization values are used for the fitting or the extrapolation or the interpolation.

In some embodiment examples, the checking device is arranged to automatically determine, on the basis of the first magnetization value (measured in step e)) transmitted by the measuring device, a further magnetization distance, the further magnetization distance being chosen closer to the magnet of the magnetizing device than the first magnetization distance (higher magnetic field strength), if from the first magnetization value it can be concluded that the magnetization of the magnetic pigments resulting after their partial counter-magnetization (despite the counter-magnetization) still points in the magnetization direction, and being chosen further away from the magnet of the magnetizing device than the first magnetization distance (lower magnetic field strength), if the magnetization of the magnetic pigments resulting after their partial counter-magnetization points in a direction opposite to the magnetization direction. As in this case the magnetic field strength used for the renewed partial counter-magnetization is lower than that used for the first partial counter-magnetization, before the renewed partial counter-magnetization the magnetization must be repeated, upon which the magnetic pigments of the areal sample are magnetized in the magnetizing direction until the saturation of their magnetization.

The checking device then transmits the further magnetization distance to the output device which is arranged to prompt the operator to effect a renewed partial counter-magnetization and a renewed measurement of magnetic pigments for the further magnetization distance, so that the operator determines a further magnetization value by means of the measuring device. Based on the first magnetization value and the further magnetization value, further magnetization distances can be automatically determined and output if required, so that the operator determines even further magnetization values of the magnetic pigments by a repeated partial counter-magnetization and by a repeated measurement.

The invention also relates to an arrangement for magnetizing the respective areal sample and for checking the coercive field strength of the magnetic pigments of the respective areal sample with the above-mentioned magnetizing device and the above-mentioned apparatus which comprises the above-mentioned measuring device and the above-mentioned checking device. The magnetizing device and the measuring device are separated from each other so that the magnetic pigments are located outside the static magnetic field of the magnetizing device during the first measurement and, where applicable, during the respective further measurement. This has the advantage that the magnetic field strength used for the partial counter-magnetization can be flexibly changed without affecting the measurement of the measuring device.

The magnetizing device has e.g. a magnetizing area for receiving the areal sample and at least one magnet which provides a static magnetic field which is arranged for the partial counter-magnetization of the magnetic pigments of the areal sample. The magnetizing device e.g. is arranged such that the areal sample (placed on the magnetizing area) and the at least one magnet, for a first partial counter-magnetization of the magnetic pigments, are movable relative to each other toward each other until the magnetic pigments are positioned at a first magnetization distance from the at least one magnet, at which the static magnetic field has a first magnetization field strength. For the renewed partial counter-magnetization of the magnetic pigments, the areal sample and the at least one magnet are movable relative to each other toward each other until the magnetic pigments are positioned at a further magnetization distance from the at least one magnet, at which the magnetic field strength of the static magnetic field is greater or smaller than the first magnetization field strength (present at the first magnetization distance). The magnetizing device according to the invention enables a well-defined magnetization of the magnetic pigments at very different magnetic field strengths. With the achievable magnetic field strengths, both low-coercive magnetic pigments which have a coercive field strength of a few oersteds and high-coercive magnetic pigments with a coercive field strength of up to 3500 oersteds (of course also magnetic pigments with coercive field strengths in between) can be counter-magnetized. In addition, the magnetic field strength used for the partial counter-magnetization is very easily adjustable with the magnetizing device according to the invention by positioning the magnetic pigments or the magnet accordingly.

The magnetizing area of the magnetizing device is preferably so large that the areal sample can be placed on the magnetizing area and moved along the magnetizing area toward the magnet of the magnetizing device. Preferably, the magnetizing area is wider and—viewed along the direction of movement of the sample—longer than the sample. The at least one magnet of the magnetizing device is arranged e.g.

such that a gap is formed between the magnetizing area and the at least one magnet, into which the areal sample can be introduced for magnetizing its magnetic pigments, the gap perpendicular to the magnetizing area being greater than the thickness of the areal sample. In this way a magnetic field strengths region as large as possible can be utilized for magnetizing the sample. For magnetization, the sample can be guided completely through the gap and for the partial counter-magnetization, guided into the gap.

In a first embodiment of the magnetizing device, for the partial counter-magnetization, the sample is guided into the gap until the magnetic pigments have achieved the desired magnetization distance from the magnet. In a second embodiment of the magnetizing device, for the partial counter-magnetization, the sample is guided into the gap until the magnetic pigments are located in the gap (centrally under the magnet or slightly laterally offset to the magnet) and subsequently the distance of the magnet from the magnetizing area is reduced until the desired magnetization distance between the magnet and the magnetic pigments of the sample is achieved. In the first embodiment of the magnetizing device, the magnetic field course of the magnetizing device stored in the checking device or in the other device indicates the magnetic field strength present on the magnetizing area as a function of the position (in the predetermined direction of movement of the sample) along the magnetizing area, parallel or antiparallel to the magnetic field gradient of the static magnetic field. In this first embodiment, the static magnetic field of the magnetizing device is invariable (with respect to the magnetizing device) or remains unchanged during the magnetization and checking of the magnetic pigments. In the second embodiment of the magnetizing device, the magnetic field course of the magnetizing device stored in the checking device or in the other device indicates the magnetic field strength present on the magnetizing area as a function of the (variable) position of the at least one magnet perpendicular to the magnetizing area and, where applicable, additionally as a function of the position of the sample along the magnetizing area, parallel or antiparallel to the magnetic field gradient.

The magnetizing area of the magnetizing device is configured to receive the sample during the first and, where applicable, during the respective renewed partial counter-magnetization of its magnetic pigments (and, where applicable, also upon the magnetization). The magnetizing area is arranged such that the areal sample received by the magnetizing area, for the partial counter-magnetization, is guided along the magnetizing area in a predetermined direction of movement (the sample contacting the magnetizing area as it is guided along), and the areal sample can be moved toward the magnet by being guided along the magnetizing area (and where applicable can be guided into the gap formed between the magnetizing area and the at least one magnet). The magnetizing area has an entry side which—viewed along the predetermined direction of movement of the sample—is arranged before of the at least one magnet, and an exit side which—viewed along the predetermined direction of movement of the sample—is arranged after the at least one magnet. Preferably, the magnetizing area extends at least on its entry side—viewed along the predetermined direction of movement—from its margin to the at least one magnet at least over the length of the areal sample, e.g. at least over 10 cm. This allows the areal sample to be conveniently positioned for the partial counter-magnetization and a high degree of positional accuracy is achieved. Preferably, the magnetizing area of the magnetizing device is limited on one or both sides by a guide which extends along the predetermined direction of movement (and is configured e.g. as a step). This makes it possible to avoid a twisting of the sample and thus to increase the positional accuracy of the sample during the partial counter-magnetization.

For providing the static magnetic field, the magnetizing device has at least one magnet. The at least one magnet extends—parallel to the magnetizing area and viewed in the direction perpendicular to the predetermined direction of movement of the sample—at least over the width of the areal sample so that this is magnetizable uniformly and throughout perpendicular to its direction of movement. On the entry side of the magnetizing device (i.e. along the predetermined direction of movement on this side of the at least one magnet), the static magnetic field is directed in the reversed direction than on the exit side of the magnetizing device (i.e. along the predetermined direction of movement beyond the at least one magnet). The magnetizing device has either only one single (accordingly long) magnet or several (preferably identical) magnets arranged in a row perpendicular to the direction of movement of the sample which are installed in the same direction. The at least one magnet is preferably arranged in such a way that either its magnetic north pole or its magnetic south pole faces with its end face the magnetizing area and the respective other magnetic pole faces away from the magnetizing area. In the case of a row of magnets, either all magnetic north poles or all magnetic south poles face with their end faces the magnetizing area. This arrangement of the magnetic poles at the end faces has the advantage that the magnetic field provided by the at least one magnet for magnetizing the sample on the magnetizing area has a large magnetic field component which is directed parallel or anti-parallel to the predetermined direction of movement of the sample. Here, on the exit side of the magnetizing device, the magnetic field component directed parallel or antiparallel to the predetermined direction of movement of the sample is directed in the reversed direction than on the entry side (directed parallel on the entry side and antiparallel on the exit side or antiparallel on the entry side and parallel on the exit side). Compared to this magnetic field component, the magnetic field component of the static magnetic field running perpendicular to the predetermined direction of movement of the sample is negligible low. On the magnetizing area of the magnetizing device, the static magnetic field's magnetic field component directed perpendicular to the magnetization direction is preferably less than 10% of the static magnetic field's magnetic field component directed parallel or antiparallel to the magnetization direction. Such an alignment of the magnetic field enables a partial counter-magnetization with a magnetic field of low strength. In addition, the measurement and the evaluation of the magnetization values is simplified, as it is sufficient to consider only the magnetization component in one spatial direction, namely the magnetization direction.

Preferably, the magnetizing device has a scale readable by an operator, from which the operator can read a measure of the magnetization distance between the magnetic pigments and the magnet of the magnetizing device. From the scale there can be read the distance of the front or rear edge of the sample from the magnet, from which distance—taking into account the distance of the magnetic pigments from the front or rear edge of the areal sample—the magnetization distance of the magnetic pigments from the magnet can be calculated automatically. The readable scale can extend along the predetermined direction of movement, e.g. can be applied to a lateral guide of the magnetizing device. This may be useful in both the first and the second embodiment of the magnetizing device. If a mechanical stop is provided, the distance of the mechanical stop from the magnet can also be read off the scale.

In the second embodiment of the magnetizing device, the magnetizing device preferably has a shifting device with the help of which the operator can adjust the distance of the at least one magnet from the magnetizing area in order to change the distance between the magnetic pigments and the magnet of the magnetizing device when the magnetic pigments are positioned between the magnet and the magnetizing area (in the gap). This shifting device can also have a scale readable by the operator, from which he can read a measure of the magnetization distance between the magnetic pigments and the magnet of the magnetization device.

BRIEF DESCRIPTION OF THE DRAWINGS

The magnetizing device may also have a mechanical stop which is displaceable along the predetermined direction of movement of the areal sample on the magnetizing device. The stop is placed e.g. flush with the lateral guide and the areal sample is moved up to the front edge of the mechanical stop until the front edge of the areal sample contacts the stop. This better defines the position and the alignment of the areal sample.

Hereinafter the invention will be explained by way of example with reference to the following figures. There are shown.

DETAILED DESCRIPTION OF VARIOUS EMBODIMENTS

Figure 1:
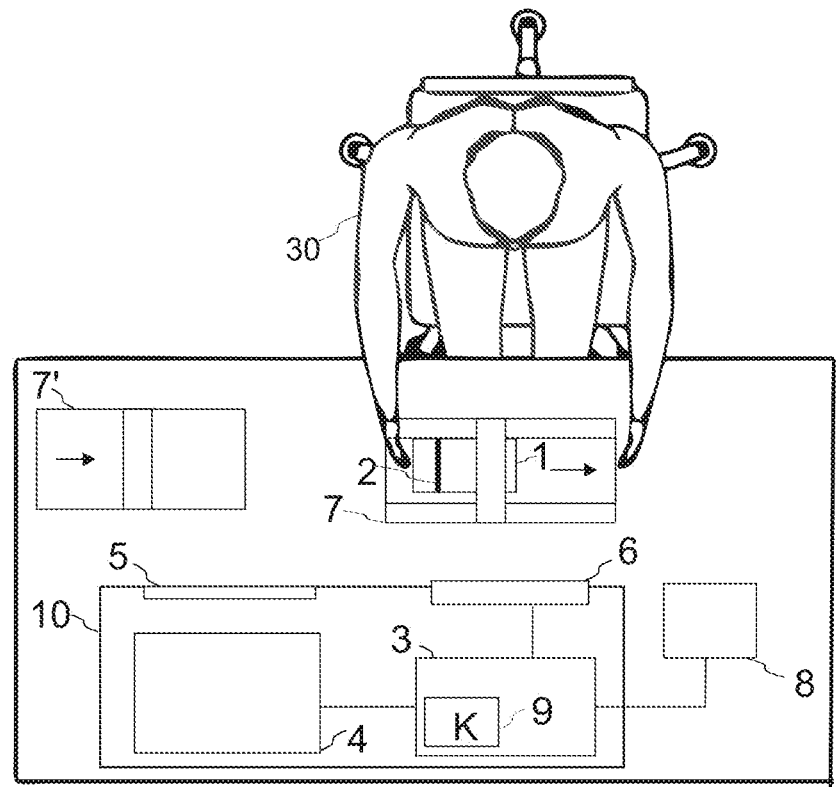
FIG. 1 an example of an arrangement for magnetizing and checking the coercive field strength of areal samples, FIG. 2 an example of a measuring device for measuring the magnetization of the areal samples, FIGS. 3a to 3d an example of a magnetizing device for magnetizing the areal samples (FIG. 3a), an example of the magnets of the magnetizing device (FIG. 3b), an areal sample positioned on a magnetizing device (FIG. 3c) and an areal sample at different distances from the magnet of the magnetizing device (FIG. 3d), FIGS. 4a to 4c a hysteresis curve of magnetic pigments with a coercive field strength K0' (FIG. 4a), a magnetic field course K(x) of the magnetizing device (FIG. 4b), the measured magnetization M(x) as a function of the magnetization distance x (FIG. 4c), FIG. 5a a magnetizing device with a displaceable mechanical stop and a readable scale, FIG. 5b,c a magnetizing device with vertically shiftable magnet, FIGS. 6a to 6e an areal sample positioned on a magnetizing device whose magnetic region extends parallel to the magnetic field gradient (FIG. 6a), or extends obliquely to the magnetic field gradient (FIG. 6d), the magnetization course M(x) of the magnetic region of FIG. 6a as a function of the magnetization distance x (FIG. 6b) and its first derivative (FIG. 6c) and the first derivative of the magnetization course M'(x) of the magnetic region of FIG. 6d as a function of the magnetization distance x (FIG. 6e), FIGS. 7a to 7c an areal sample positioned on a magnetizing device, whose magnetic serial number is oriented antiparallel to the magnetic field gradient (FIG. 7a), and the ascertainment of the target magnetization distance xm with the help of the standard deviation (FIG. 7b, c).
Figure 2:
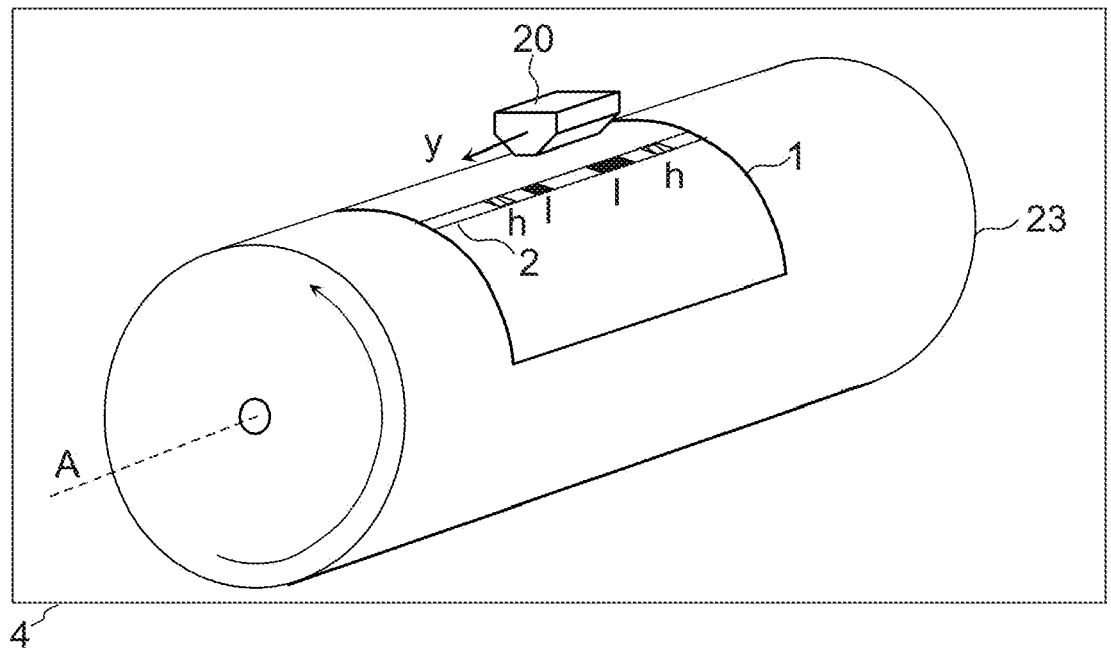

With reference to FIG. 1 the check of the coercive field strength of magnetic pigments of an areal sample 1 is explained by way of example. The magnetic pigments are present in a magnetic region of the sample 1, which magnetic region in this example is formed by a magnetic security thread 2. The magnetic pigments can be applied throughout along the security thread or only locally, e.g. as part of a magnetic coding of high-coercive and/or low-coercive magnetic regions h, l, cf. FIG. 2. However, the magnetic region of the magnetic pigments can also be formed by another security element, e.g. a magnetic imprint. In this example, the areal sample is formed as a value document.

For magnetization, the magnetic pigments are first magnetized by means of a magnetizing device which provides a static magnetic field. For this, the magnetizing device 7 shown in FIG. 1 can be used or another magnetizing device 7' which provides a magnetic field with greater magnetic field strength. For magnetizing the sample, there is used e.g. another magnetizing device 7' (with a greater magnetic field strength), when the magnetic field of the magnetizing device 7 exceeds the coercive field strength of the sample but is not sufficient for the saturation of its magnetization. For magnetization, the sample 1 is pushed completely through the magnetizing device 7 (or 7') along the direction of the arrow by an operator 30, which is explained in more detail with reference to FIG. 3a. During the magnetization, the sample 1 is magnetized in a magnetizing direction (which here is directed along the arrow) until the saturation of its magnetization. Thereafter, the sample is removed from the static magnetic field of the magnetizing device. Preferably, the magnet of the magnetizing device has a magnetic field strength which exceeds the (expected) coercive field strength of the sample by a factor of 2, particularly preferably by a factor of 5. For example, the magnet of the magnetizing device has a magnetic field strength of at least 0.75 T, preferably at least 1 T.

In order to obtain a reference value for the later magnetization measurements, the magnetization achieved by magnetization can be measured (remanence measurement). However, the magnetization values described below can also be evaluated without such a reference value. The respective measurement of the respective magnetization value, which is carried out after the respective partial counter-magnetization of the sample 1, is carried out with a measuring device 4. The optional remanence measurement can also be carried out with the measuring device 4.

For measuring the magnetization of the sample 1, e.g. a measuring device 4 is used which is contained in a unit 10 and is accessible through a hinged window 5 from the outside for the operator 30 of the unit 10. In this example, the measuring device 4 has a drum 23 on which the operator places the magnetized sample 1, cf. FIG. 2. For fastening, the sample is sucked on by the drum. A magnetic detector 20 is mounted on a scanning device (not shown) which is transportable along the direction y at a small distance from the drum 23. The drum 23 is rotatable about an axis A which runs parallel to the y direction. Through the rotation of the drum 23, the sample 1 can be repeatedly transported past the magnetic detector 20 along the circumference of the drum 3. Upon each drum rotation, the magnetization of those magnetic regions h, l of the security thread 2 can be detected, which, depending on the y position of the magnetic detector 20, are located at that moment in the capture region of the magnetic detector 20. By slowly moving the magnetic detector 20 along the y direction and simultaneously rotating the drum 23 at high speed, the magnetization of various portions or magnetic regions h, l of the security thread can be detected one after the other. Here, the magnetization is measured without the influence of a magnetic field.

The unit 10 and the magnetizing device 7 are arranged within reach of the operator 30 who feeds the sample 1, where applicable, alternately to the magnetizing device 7 and to the measuring device 4 of the unit 10. The unit 10 has a checking device 3 connected to the measuring device 4, which is arranged to evaluate the magnetization values measured by the measuring device 4 and in which a magnetic field course K(x) of the magnetizing device 7 is stored, which is used to check the coercive field strength of the magnetic pigments. The unit 10 further has an output device, e.g. a display device, and an input device for the operator 30. In the unit 10, the two are present together as an input and output device 6, e.g. in the form of a touch screen. Further, another device 8, e.g. a computer, can be connected to the unit 10, in which the magnetic field course K(x) of the magnetizing device 7 can be stored and which, where applicable, can be used to evaluate the measurement results. The measuring device 4 and the checking device 3 need not be housed in one common unit 10, but can also be independent.

Magnetizing Device

Figure 3A:
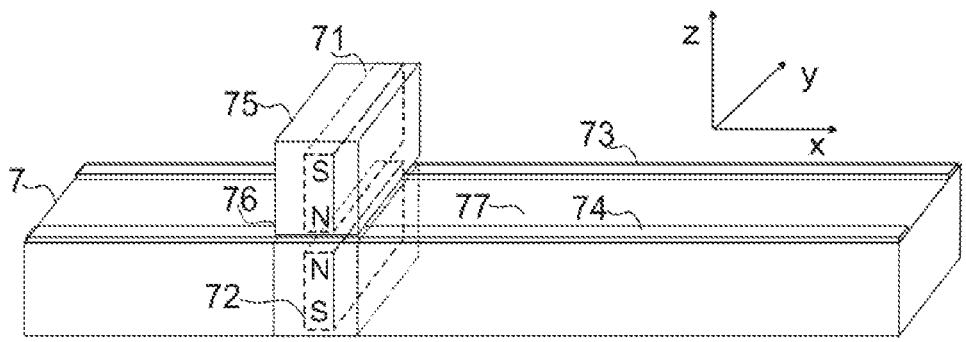

FIG. 3a shows by way of example a magnetizing device 7 which provides a magnetizing area 77 for receiving the sample 1, which is configured to receive the sample during the magnetization of its magnetic pigments. For the purpose of magnetizing it, the sample 1 is placed at the entry side (on the right) on the magnetizing area 77 by the operator 30 and guided along the magnetizing area (where applicable into the gap 76) in a predetermined direction of movement of the sample (here the −x direction). Upon being guided along, the sample slides on the magnetizing area 77. The magnetizing area 77 is limited on both sides by guides 73, 74, which are configured as a step and extend along the predetermined direction of movement −x. The magnetizing device 7 has at least one magnet 71 whose magnetic north pole (alternatively the south pole) with its end face faces the magnetizing area 77. Only one single wide magnet 71 or several magnets 71 of the same direction and type arranged in a row perpendicular to the direction of movement −x of the sample can be used, whose magnetic north poles (alternatively south poles) face with their end faces the magnetizing area 77. The at least one magnet 71 extends—parallel to the magnetizing area 77 and viewed in the direction perpendicular to the direction of movement −x of the sample—over the entire width of the sample, whereby a homogeneous magnetization of the sample 1 is achieved over its entire width.

Figure 3B:
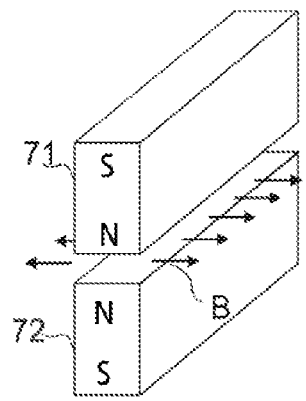

Opposite the magnet 71, at least one further magnet 72 can be arranged, which is oriented mirror-inverted to the magnet 71, so that its magnetic north pole (alternatively the south pole) with its end face also faces the magnetizing area 77. Analogous to the magnet 71, several magnets 72 with the same direction can also be used. The magnetic field B provided by the magnets 71, 72 for magnetizing the sample on the magnetizing area 77 therefore has a magnetic field component which is directed parallel or antiparallel to the direction of movement of the sample. The magnetizing area 77 has an entry side (on the right) which—viewed along the predetermined direction of movement (−x) of the sample—is arranged before the at least one magnet, and (on the left) an exit side which—viewed along the predetermined direction of movement of the sample—is arranged after the at least one magnet. On the entry side of the magnetizing device 7 (located on the right in FIG. 3a), this magnetic field component points in the positive x direction. On the exit side of the magnetizing device 7 (on the left in FIG. 3a), this magnetic field component points in the negative x direction, i.e. is directed in the reversed direction than on the entry side of the magnetizing device 7, cf. FIG. 3b.

The magnetizing device can also be equipped with—instead of the opposing magnets 71, 72—one or more magnets only on one side (either magnet(s) 71 above or magnet(s) 72 below the magnetizing area 77). The magnetic field B thus generated on the magnetizing area 77 is then not exactly parallel or antiparallel to the x direction, but also has a component in the z direction. The evaluation of the magnetization values, however, can be restricted to the x direction, when the checking device 3 is only sensitive to the magnetization in the x direction.

The at least one magnet 71 is located in a crossbar 75, which is arranged at a small (z) distance above the magnetizing area 77. The distance between the crossbar 75 and the magnetizing area is at least the thickness of the sample 1. The at least one magnet 72 is arranged below the magnetizing area 77, cf. FIG. 3a. A gap 76 is formed between the magnetizing area 77 and the crossbar 75 in which the at least one magnet 71 is located, into which the areal sample 1 can be introduced for magnetizing its magnetic pigments. For magnetization, the sample 1 can be guided completely (from right to left in FIG. 3a) through the gap 76. Since the magnetic field B on the exit side of the magnetizing device points in the negative x direction, the magnetic pigments are magnetized in the negative x direction until saturation. For the partial counter-magnetization, the sample 1 is moved, starting from the entry side (on the right), in the direction of the crossbar 75 (in the −x direction) until the magnetic pigments are located at the desired magnetization distance x0 from the magnets 71, 72, cf. FIG. 3c. When the movement of the sample 1 is stopped, the magnetic pigments to be subjected to the partial counter-magnetization are located to the right of the magnets 71, 72 and thus in the portion of the magnetic field B in which the magnetic field direction is directed in the positive x direction, cf. FIGS. 3b, 3c. Depending on the location of the magnetic pigments on the sample 1 and depending on the chosen magnetization distance x0, it may be necessary to guide the sample (its front edge) partially into the gap 76. The magnetic field strength of the magnetic field B—starting from the position x=0, where the magnets 71, 72 are located—decreases to the right, corresponding to the lines of a constant magnetic field L (in the x-y plane) outlined in FIG. 3c. If the magnetic pigments are present in a long magnetic region on the sample 1, the magnetization distance x0 is considered to be the magnetization distance of a representative part of the magnetic region, e.g. the center of the respective magnetic region or the point of the magnetic region closest to the magnet.

Figure 3C:
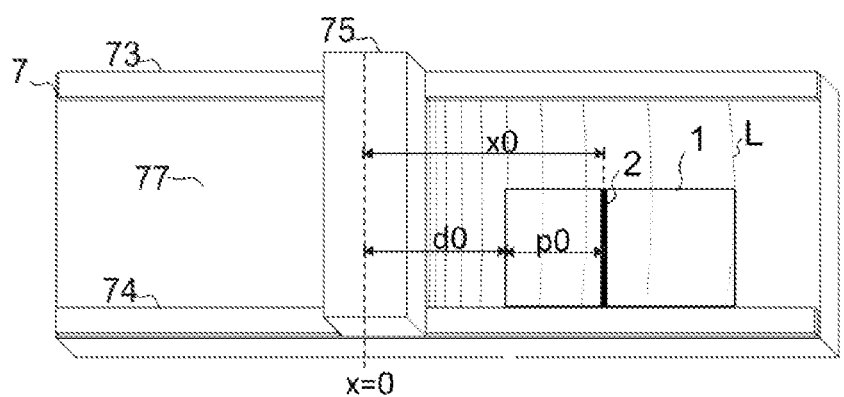
Figure 4A:
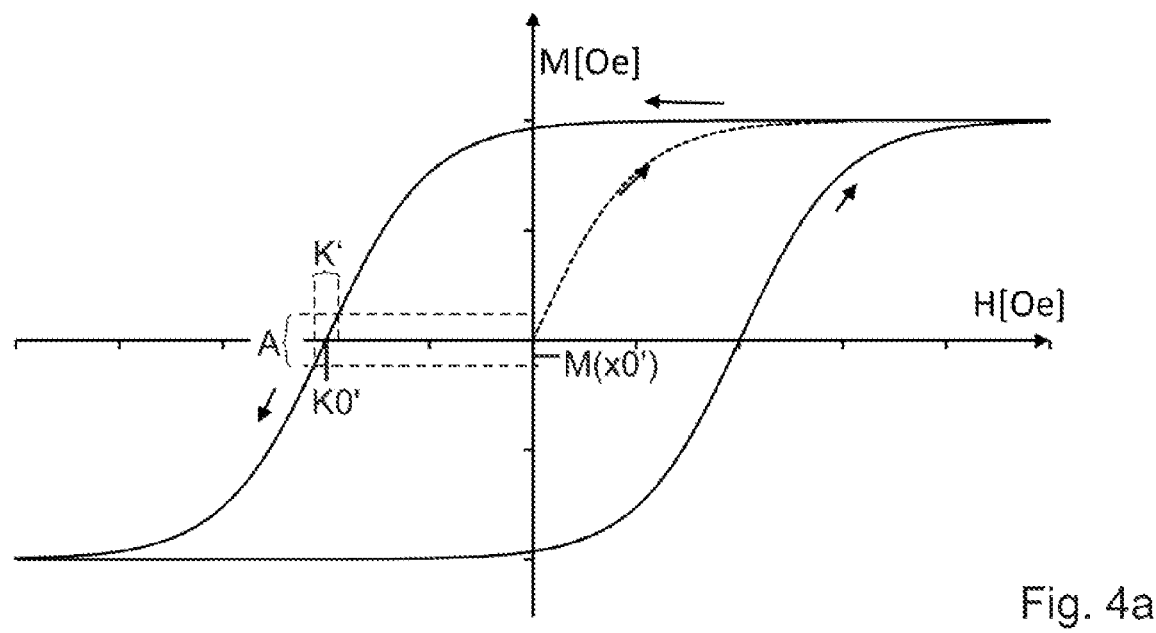
Figure 4B:
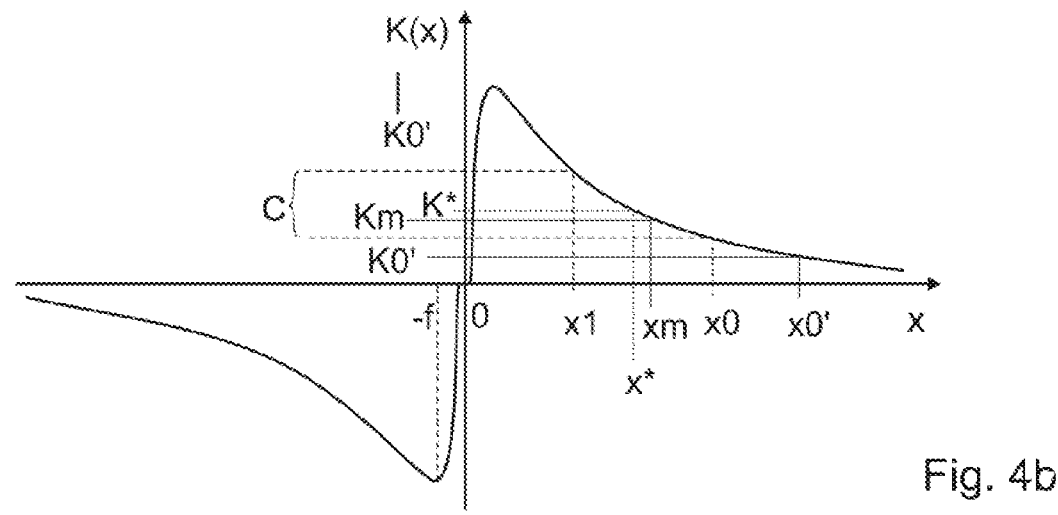

In FIG. 4b there is outlined by way of example the magnetic field course K(x) of the magnetizing device 7, i.e. the curve of the x component of the magnetic field strength of the magnetic field B as a function of the magnetization distance x, cf. FIG. 3c. At the point x=0, i.e. immediately underneath the magnet 71, the x component of the magnetic field B is vanishingly small, but already at small magnetization distances x (at the edge of the magnet 71) the magnetic field strength rises sharply and subsequently decreases monotonically with increasing magnetization distance x. For the respective partial counter-magnetization, the magnetic pigments are brought at a magnetization distance that lies in the monotonically decreasing branch of the magnetic field course K(x), at most up to the point at which the maximum of the magnetic field course K(x) is achieved.

Partial Counter-Magnetization

Figure 3D:
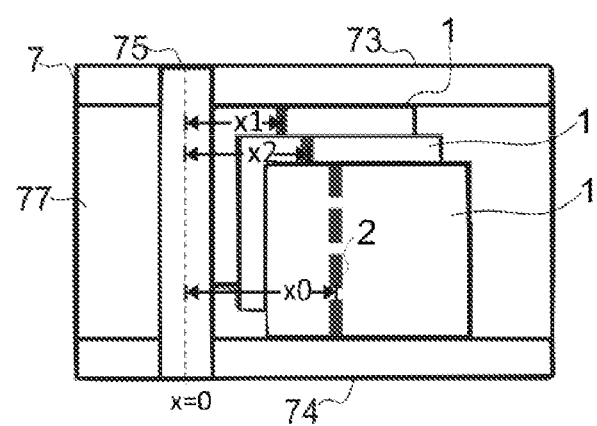

After the magnetization (and where applicable after the remanence measurement), the first partial counter-magnetization of the magnetic pigments is carried out, in which the magnetic pigments of the sample are partially counter-magnetized by the static magnetic field of the magnets 71, 72. For the first partial counter-magnetization, the sample is placed on the magnetizing area 77 of the magnetizing device 7 and the magnetic pigments are brought into the static magnetic field B in such a position in which the static magnetic field B is directed in the positive x direction, i.e. opposite to the magnetization direction of the sample (negative x direction), i.e. at a magnetization distance on the positive x axis. The sample and the magnet are moved relative to each other toward each other until the magnetic pigments are positioned at a first magnetization distance from the magnet in the static magnetic field. For positioning, the sample 1 can be moved toward the magnet 71 (in the embodiment example of FIGS. 3d and 5a). In addition, the magnet 71 can be moved toward the sample 1 where applicable (in the embodiment example of FIG. 5b, 5c). After this partial counter-magnetization, the sample is moved away from the magnet 71, 72 in the reverse direction, i.e. in the positive x direction, and removed from the static magnetic field B.

The magnetization of the magnetic pigments resulting after the partial counter-magnetization can be vanishingly small or directed in or opposite to the magnetization direction, depending on whether at the magnetization distance x0 at which the sample is brought for partial counter-magnetization exactly the coercive field strength K0 of the magnetic pigments is present or whether the coercive field strength of the magnetic pigments is exceeded or undershot at the magnetization distance. If at the chosen magnetization distance x0 exactly the coercive field strength is achieved, upon the partial counter-magnetization the magnetic pigments are counter-magnetized such that their resulting magnetization is vanishingly small or ideally zero. If the chosen magnetization distance is x>x0, upon the partial counter-magnetization a magnetic field strength K<K0 is achieved that is lower than the coercive field strength K0, so that upon the partial counter-magnetization the magnetic pigments are less than half counter-magnetized and the resulting magnetization of the magnetic pigments continues to point in the magnetization direction (negative x direction). If the chosen magnetization distance is x<x0, upon the partial counter-magnetization a magnetic field strength K>K0 is achieved that is greater than the coercive field strength K0, so that upon the partial counter-magnetization the magnetic pigments are more than half counter-magnetized and the resulting magnetization of the magnetic pigments points in a direction reversed to the magnetization direction, i.e. in the positive x direction.

After the first partial counter-magnetization of the sample 1, a first magnetization value is measured by means of the measuring device 4, which is characteristic of the partial counter-magnetization of the magnetic pigments achieved at the respective chosen magnetization distance. During the measurement of the first magnetization value, the magnetic pigments are located outside the static magnetic field of the magnetizing device (i.e. at such a great distance from the magnetizing device that the static magnetic field thereof causes no/a negligible low magnetization). FIG. 4a there is drawn an example of the measured first magnetization value M(x0') which was achieved by the first partial counter-magnetization by means of the magnetizing device 7 at a magnetization distance x0'.

Optional Renewed Partial Counter-Magnetization and Measurement

The above-described partial counter-magnetization and the subsequent measurement of a magnetization value can be repeated or carried out again if required, e.g. in dependence on the previously measured first magnetization value. The partial counter-magnetization and the subsequent measurement of a further magnetization value are carried out again e.g. when the magnetic region of the magnetic pigments whose coercive field strength is being checked extends perpendicularly to the magnetic field gradient of the magnetizing device. The renewed partial counter-magnetization and measurement can be dispensed with when the magnetic region of the magnetic pigments extends parallel or antiparallel to the magnetic field gradient or the x direction.

Depending on the choice of the magnetization distance chosen for the renewed partial counter-magnetization, it may be necessary to repeat the magnetization (before the partial counter-magnetization), namely when the magnetic field strength used for the renewed partial counter-magnetization is lower than that used for the previous partial counter-magnetization. However, if the magnetic field strength used for the renewed partial counter-magnetization is greater than that used for the previous partial counter-magnetization, it is not necessary to repeat the magnetization.

In the renewed partial counter-magnetization—as in the first partial counter-magnetization—the sample is placed on a magnetizing area 77 of the magnetizing device 7 and the sample 1 and the magnet 71 are moved relative to each other toward each other until the magnetic pigments are positioned at a further magnetization distance x1 (different from the first magnetization distance x0) from the magnet in the static magnetic field, at which the magnetic field strength is greater or smaller than at the first magnetization distance (and greater or smaller than in an, where applicable, already previously carried out renewed partial counter-magnetization). After the renewed partial counter-magnetization of the sample 1, a further magnetization value is measured by means of the measuring device 4, which is characteristic of the partial counter-magnetization of the magnetic pigments which is achieved at the magnetization distance chosen in the renewed partial counter-magnetization. Here too, the magnetic pigments are located outside the static magnetic field of the magnet during the further measurement(s).

Checking Device and Check Result

The first magnetization value measured upon the first measurement and, where applicable, the further magnetization value(s) of the partially counter-magnetized magnetic pigments measured upon the further measurement(s) are transmitted from the measuring device 4 to the checking device 3 connected to the measuring device. The transmission can be effected after each individual measurement, i.e. before the renewed partial counter-magnetization, or after the end of the renewed measurements. In the checking device 3, a magnetic field course K(x) of the magnetizing device 7 is stored. For example, the checking device has a memory region 9 in which the magnetic field course K(x) of the magnetizing device as a function of the distance x from the magnet of the magnetizing device is stored, cf. FIG. 1. The checking device 3 checks the first magnetization value measured in the first measurement (and, where applicable, the further magnetization value(s) of the partially counter-magnetized magnetic pigments measured in the further measurement(s)) in order to determine a check result which relates to the coercive field strength of the magnetic pigments.

In a first embodiment example, this check result comprises e.g. the confirmation of a specified requested coercive field strength or a specified requested coercivity region. In this first embodiment example, the magnetic field course of the magnetizing device 7 is used to ascertain a (and possibly at least one further) magnetization distance which is to be chosen for the first (and where applicable the further) counter-magnetization between the magnetic pigments and the magnet, and this magnetization distance is output for the operator of the magnetizing device, e.g. by displaying it on the input and output device 6 connected to the checking device.

In other embodiment examples (2-7), the check result comprises a numerical value of the coercive field strength which is determined upon checking by the checking device 3. In these other embodiment examples 2-7, the magnetic field course K(x) of the magnetizing device is used for ascertaining the check result relating to the coercive field strength.

The check result relating to the coercive field strength of the magnetic pigments, in particular the confirmation of a specified requested coercive field strength or of a specified requested coercivity region or the numerical value of the coercive field strength, is subsequently output by an input and output device 6 connected to the checking device 3, to which the checking device transmits the check result.

First Embodiment Example

In the first embodiment example, it is checked whether the magnetic pigments have a specified requested coercive field strength K0'. For this, the following steps are carried out:

Specifying a requested coercive field strength K0' by the operator 30, where applicable via choosing one of several specified magnetic pigment types which the operator chooses at the input and output device 6. Alternatively, the operator can choose the magnetic pigment type indirectly via choosing the sample type or value document type for which the coercive field strength of the respective magnetic pigment and, where applicable, the respective location of the respective magnetic region on the sample is stored in the checking device 3. For example, the operator receives a corresponding prompt at the input and output device 6. In the ideal case, in a partial counter-magnetization of the magnetic pigments with exactly the coercive field strength, a (first) magnetization value of zero is to be expected.

Automatically determining the magnetization distance x0' to be chosen for the respective magnetic pigment having the requested coercive field strength K0', at which the magnetic pigments are to be positioned from the magnet 71 and at which the partial counter-magnetization should ideally lead to a resulting magnetization of the magnetic pigments of zero. This magnetization distance x0' is automatically determined by means of the checking device 3 with the aid of the stored magnetic field course K(x). For this, with the aid of the magnetic field course K(x) that magnetization distance x0' is picked out at which the magnetic field strength corresponds to the requested coercive field strength K0', cf. FIG. 4b. The magnetization distance x0' to be chosen for the chosen magnetic pigments is displayed to the operator 30 at the input and output device 6.

Magnetizing the magnetic pigments until the saturation of their magnetization by means of the magnetizing device 7 or 7' by the operator.

Partially counter-magnetizing the magnetic pigments at the previously determined magnetization distance x0' by means of the magnetizing device 7 by the operator. The operator places the sample e.g. on the far right onto the magnetizing device and moves it in the negative x direction until the magnetic pigments, e.g. the security thread 2, are at the magnetization distance x0' from the magnet 71. The sample is then drawn back in the positive x direction, lifted off the magnetizing device 7 and placed in the unit 10 in order to measure the magnetization M(x0'), cf. FIG. 4a.

The checking device 3 receives the magnetization value M(x0') from the measuring device 4 and then checks whether the magnetization M(x0') vanishes or lies in an acceptance region A around zero. If so, the checking device 3 causes the input and output device 6 to output a confirmation that the magnetic pigments have the specified requested coercive field strength K0'. In the example of FIG. 4a, although the first magnetization value M(x0') is not zero, it is within the acceptance region A. Such a confirmation is therefore output at the input and output device 6 of the unit 10.

Otherwise, when the checking device 3 has established that the first magnetization value is outside the acceptance region A, it is output at the input and output device 6 of the unit 10 that the magnetic pigments do not have the specified requested coercive field strength K0'. If the checking device 3 has established that the measured magnetization still points in the direction of magnetization, despite the partial counter-magnetization, (when M(x0') is above the acceptance region A, cf. FIG. 4a), it can also be output that the coercive field strength of the magnetic pigments is greater than the specified coercive field strength K0'. If the measured magnetization after the partial counter-magnetization points in a direction opposite to the magnetization direction (when M(x0') is below the acceptance region A, cf. FIG. 4a), it can be output that the coercive field strength of the magnetic pigments is lower than the specified coercive field strength K0'.

Optionally, the operator can additionally indicate the acceptance region A for the (first) magnetization value to be measured. The acceptance region A includes the ideally expected magnetization value of zero and indicates how large the deviation of the measured (first) magnetization value from the value zero is allowed to be in order for the coercive field strength of the magnetic pigments to be confirmed—despite an (acceptable) deviation from zero, cf. FIG. 4a. The deviation may be due to e.g. variations of the magnetic pigments themselves or due to measurement inaccuracies, or due to a positional inaccuracy of the sample on the magnetizing device 7. Alternatively, the acceptance region A can also be firmly specified. The acceptance region A can also be chosen or specified via a coercivity region K', which, according to the hysteresis curve of the respective magnetic pigments corresponds to the acceptance region A, cf. FIG. 4a.

In a further development of the first embodiment example, in the event that the checking device has established that the measured magnetization does not lie within the acceptance region A despite partial counter-magnetization, the partial counter-magnetization and measurement are carried out again with the target of determining the actual coercive field strength of the examined magnetic pigments as described below: For this, the partial counter-magnetization is repeated or carried out again with a further magnetization distance x1' instead of the magnetization distance x0' and subsequently a further magnetization value is measured with the measuring device 4. The further magnetization distance x1' is chosen closer to the magnet 71 (higher magnetic field strength), if the first magnetization value still points in the direction of the magnetization despite partial counter-magnetization, and further away from the magnet 71 (lower magnetic field strength), if the first magnetization value points in a direction opposite to the magnetization. Then the further magnetization value M(x1') is checked as to whether it vanishes or lies in the acceptance region A around zero. If required, the partial counter-magnetization and subsequent measurement of a further magnetization value can be carried out again several times varying the magnetization distance x, e.g. until a further magnetization value is achieved that is vanishingly small or lies in the acceptance region A around zero. For this magnetization distance, the associated coercive field strength is then determined with the aid of the magnetic field course K(x) and output to the operator.

After one or more magnetization measurements, the checking device, where applicable automatically, checks with the aid of a termination criterion, whether the coercive field strength can be determined with the aid of the previous magnetization measurement values. For example, the checking device may check whether sufficient magnetization values are present to calculate the coercive field strength with sufficient accuracy, e.g. at least 2 very low magnetization measurement values (e.g. <20% of the remanence). As a termination criterion it can also be checked whether successive magnetization measurements lead to magnetization values with reversed signs.

In the first embodiment example, a specified coercive field strength was checked and the first magnetization distance used for the first partial counter-magnetization was chosen in targeted fashion such that the magnetic pigments are thereby exposed to a magnetic field strength which is approximately the (alleged) coercive field strength of the magnetic pigments.

Second Embodiment Example

In the second embodiment example, however, the first magnetization distance used for the first partial counter-magnetization is chosen differently in targeted fashion.

First, the magnetic pigments are magnetized by the operator by means of the magnetizing device 7 or 7' until the saturation of their magnetization, as described above. Analogous to the first embodiment example, a coercive field strength K* is chosen by the operator, which the operator assumes for the magnetic pigments to be examined. Unlike in the first embodiment example, however, two partial counter-magnetizations and measurements are then carried out at two magnetization distances x0 and x1 which lie below and beyond that magnetization distance x* which, according to the magnetic field course K(x), corresponds to the specified coercive field strength K*, cf. FIG. 4b. For example, the first magnetization distance x0 is chosen such that a considerable magnetization still remains in the magnetization direction after the first partial counter-magnetization and an accordingly great first magnetization value M(x0) is measured in the following measurement, which is significantly greater than zero. Thereafter, a second partial counter-magnetization is carried out, which generates a considerable magnetization in the opposite direction to the magnetization direction, and an accordingly great further magnetization value M(x1) is measured in the following measurement, which is distinctly below zero. For increasing the accuracy, still further partial counter-magnetizations and measurements can be carried out at other magnetization distances in order to obtain further "supporting points" of magnetization values.

Figure 4C:
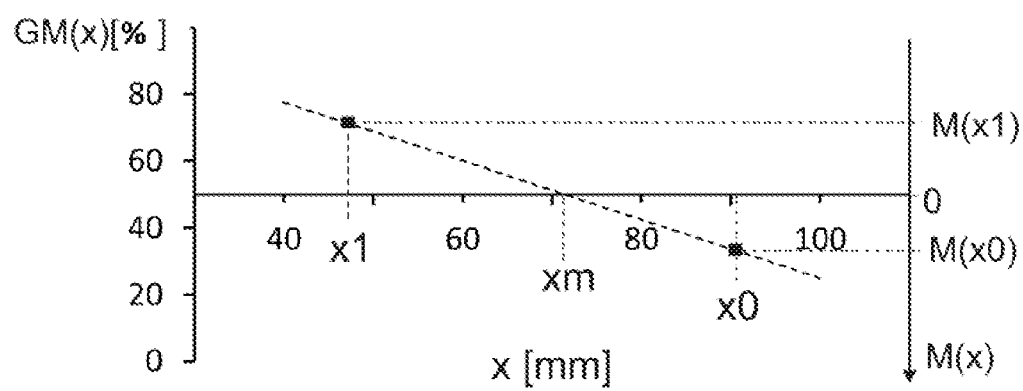

Then the first and the at least one further magnetization value M(x0), M(x1) are interpolated to determine the searched-for target magnetization distance xm at which the magnetization M(x) is equal to zero, cf. FIG. 4c. From the target magnetization distance xm ascertained in this way, the checking device 3 can determine the actual coercive field strength Km of the magnetic pigments with the aid of the magnetic field course K(x), cf. FIG. 4b, which is then output at the input and output device 6.

Third Embodiment Example

In the third embodiment example, two magnetization distances for the partial counter-magnetization are specified by the operator and the coercive field strength is determined automatically with the aid of the magnetization values measured respectively.

First, the magnetic pigments are magnetized by the operator by means of the magnetizing device 7 or 7' until the saturation of their magnetization, as described above. Where applicable, first the remanent magnetization R is measured, which is achieved after the magnetic pigments have been magnetized up to their saturation (remanence measurement). Thereafter, a first magnetization value M(x0) is measured after a partial counter-magnetization at a first magnetization distance x0 and a further magnetization value M(x1) is measured after a partial counter-magnetization at a further magnetization distance x1. The magnetization distances x0 and x1 can be chosen by the operator himself, who enters these at the input and output device 6 for the checking device.

The first and further magnetization values can be related to the previously measured remanent magnetization R according to the formula $GM(x)=(R-M(x))/2R$ and thus be given as a percentage of the remanent magnetization, cf. FIG. 4c. For the scale GM(x) on the left in FIG. 4c, GM=0% corresponds to a magnetization value equal to the remanent magnetization R, and GM=100% means that with the partial counter-magnetization a saturation and thus a remanent magnetization in the opposite direction has been achieved, i.e. $M(x)=-R$. The value GM=50% corresponds to a magnetization value M(x)=0.

From the first and further magnetization values M(x0) and M(x1), the checking device ascertains the target magnetization distance xm at which the magnetization course M(x) has a zero crossing (M(xm)=0 or GM=50%). The searched-for target magnetization distance xm can be determined e.g. by interpolating the magnetizations M(x0), M(x1) of the magnetic pigments measured for the two magnetization distances x0, x1, cf. FIG. 4c. If both magnetization values are on the same side of the zero crossing, an extrapolation is carried out accordingly. From the target magnetization distance xm ascertained in this way, the checking device can then determine the actual coercive field strength Km of the magnetic pigments with the aid of the magnetic field course K(x), cf. FIG. 4b and output the same at the input and output device 6.

Fourth Embodiment Example

In the fourth embodiment example, an unknown coercive field strength is determined while specifying a coercivity region to be checked. The operator specifies e.g. a coercivity region C in which he assumes the coercive field strength of the magnetic pigments to be checked, cf. FIG. 4b, e.g. by inputting a lower and upper limit of the coercivity region C at the input and output device 6.

First, the magnetic pigments are magnetized by the operator by means of the magnetizing device 7 or 7' until the saturation of their magnetization, as described above. The checking device determines with the aid of the magnetic field course K(x) two or more than two magnetization distances x0, x1, . . . at which the operator is to place the magnetic pigments for the respective partial counter-magnetization on the magnetizing device 7. For example, the magnetization distances of the limits of the specified coercivity region C are chosen (in FIG. 4b these are x0 and x1). Then renewed measurements of the respective further magnetization values can be carried out with a stepwise variation of the magnetization distance x=x0, x1, x2, . . . , as outlined in FIG. 3d. Between x0 and x1, further magnetization distances can also be chosen for repeated partial counter-magnetizations which cover the region x0 to x1 e.g. equidistantly, and corresponding measurements can be carried out. As already described above, at least a first magnetization value M(x0) is measured after the first partial counter-magnetization at the first magnetization distance x0 and a further magnetization value M(x1) is measured after the renewed partial counter-magnetization at the second magnetization distance x1, as well as, where applicable, further magnetization values M(x2), after the renewed partial counter-magnetization at further magnetization distances x2, . . . .

As in the third embodiment example, subsequently, the first and the at least one further magnetization value are interpolated to determine the searched-for target magnetization distance xm at which the magnetization M(x) is equal to zero, cf. FIG. 4c. From the target magnetization distance xm ascertained in this way, the checking device 3 can determine the actual coercive field strength Km of the magnetic pigments with the aid of the magnetic field course K(x), cf. FIG. 4b, which is then output at the input and output device 6.

Fifth Embodiment Example

In the fifth embodiment example, an unknown coercive field strength is determined with no operator specification being required.

First, the magnetic pigments are magnetized by the operator by means of the magnetizing device 7 or 7' until the saturation of their magnetization, as described above. The checking device automatically sets a first magnetization distance x0 for the first partial counter-magnetization, e.g. in the middle between the crossbar and the right edge of the magnetizing device 7 or at a particular magnetization distance from the magnet 71 which corresponds to a usual coercive field strength or the most recently measured coercive field strength. The checking device 3 outputs this magnetization distance x0 at the input and output device 6 for the operator.

After the magnetization of the magnetic pigments until the saturation of their magnetization, the operator carries out the partial counter-magnetization of the magnetic pigments at the automatically set magnetization distance x0 by means of the magnetizing device 7. The sample is then inserted into the unit 10 in order to measure the magnetization M(x0) by means of the measuring device 4. The checking device 3 receives the magnetization value M(x0) from the measuring device 4 and then checks whether the magnetization M(x0) vanishes or lies in the acceptance region A around zero. If yes, the checking device 3 picks out the coercive field strength K0 associated with the magnetization distance x0 with the aid of the magnetic field course K(x), cf. FIG. 4b, and causes the input and output device 6 to output information that the magnetic pigments have the coercive field strength K0.

If, however, the magnetization M(x0) does not vanish or does not lie within the acceptance region A around zero, a further magnetization distance x1 is automatically determined, which is chosen closer to the magnet 71 (higher magnetic field strength), if the magnetization M(x0) measured in the previous step still points in the direction of magnetization despite partial counter-magnetization (M(x0)>>0), and which is chosen further away from the magnet 71 (lower magnetic field strength), if the magnetization M(x0) measured in the previous step points in a direction opposite to the direction of magnetization (M(x0)<<0). In the latter case, before the renewed partial counter-magnetization, the magnetization of the magnetic pigments of the areal sample must be repeated until the saturation of their magnetization. Then the partial counter-magnetization is carried out again at the further magnetization distance x1, a further magnetization value M(x1) is measured and it is checked whether this vanishes or lies in the acceptance region A around zero. If yes, the checking device 3 picks out the coercive field strength K1 associated with the magnetization distance x1 with the aid of the magnetic field course K(x), cf. FIG. 4b, and causes the input and output device 6 to output information that the magnetic pigments have the coercive field strength K1.

If this is again not the case, the partial counter-magnetization and subsequent measurement of a further magnetization value M(x) is carried out once again varying the magnetization distance x, namely until a further magnetization value is (e.g. M(xm)) is achieved that is vanishingly small or lies in the acceptance region A around zero. With each variation, a further magnetization distance x2, x3 . . . is automatically determined, which is chosen closer to the magnet (higher magnetic field strength), if the magnetization measured in the previous step still points in the direction of the magnetization direction despite partial counter-magnetization, and which is chosen further away from the magnet (lower magnetic field strength), if the magnetization measured in the previous step points in a direction opposite to the magnetization direction. If the direction of the steps has to be reversed when varying the magnetization distances (i.e. first reducing the magnetization distance and in the next step increasing the magnetization distance or vice versa), the step size of the magnetization distance is preferably chosen smaller than in the previous step. This allows the searched-for target magnetization distance xm to be achieved with just a few steps.

As soon as a measurement has been carried out in which the further magnetization value vanishes or lies in the acceptance region A around zero, the checking device 3 picks out the coercive field strength Km associated with this target magnetization distance xm with the aid of the magnetic field course K(x), cf. FIG. 4b, and causes the input and output device 6 to output information that the magnetic pigments have the coercive field strength Km.

Sixth Embodiment Example

In the sixth embodiment example, an unknown coercive field strength of the magnetic pigments of one or several long magnetic regions is determined, in which the magnetic pigments are homogeneously contained. For the partial counter-magnetization, the magnetic region is placed on the magnetizing device 7 along the magnetic field gradient or along the distance coordinate x of the magnetic field course K(x) or obliquely thereto.

The long magnetic region can be e.g. a magnetic security thread that is throughout and homogeneously furnished with the same magnetic pigment. However, the security thread can also have several magnetic regions of the same magnetic pigment, in each of which the magnetic pigment is preferably distributed homogeneously, as shown in the example in FIG. 6a. The security thread 2 in FIG. 6a has a magnetic coding made of 5 magnetic regions 22 of the same coercive field strength. As an alternative to magnetic security threads, however, other long magnetic regions can also be checked in the manner described below.

First, the magnetic pigments are magnetized by the operator by means of the magnetizing device 7 or 7' until the saturation of their magnetization, as described above. For this, the sample is placed on the magnetizing device 7 on the entry side such that the long magnetic region is oriented along the magnetic field gradient (−x direction) and is drawn through from right to left under the crossbar 75. Subsequently, a remanence magnetization course R(x) of the magnetized magnetic pigments along the distance coordinate x on the sample can be measured by means of the measuring device 4, where applicable.

Also for the partial counter-magnetization, the security thread 2 in FIG. 6a is placed on the magnetizing device 7 parallel to the direction of movement, i.e. oriented parallel to the magnetic field gradient, i.e. the security thread runs along the distance coordinate x of the magnetic field gradient K(x). The position of sample 1 can be set automatically or by the operator. For example, for this, the front edge of the long magnetic region 2 is positioned at the margin of the crossbar 75 (x=d), cf. FIG. 6a. Due to this orientation of the long magnetic region, the magnetic pigments located in different portions of the long magnetic region are counter-magnetized to different degrees. The portions closer to the magnet 71 during the partial counter-magnetization are counter-magnetized more strongly than the portions lying further away.

Subsequently, a magnetization course M(x) of the partially counter-magnetized magnetic pigments is measured along the distance coordinate x on the sample by means of the measuring device 4, cf. FIG. 6b. In contrast to the previous embodiment examples, the measured magnetization M(x) is a continuous function of the distance x. The magnetization course M(x) contains a first magnetization value M(x0) and many further magnetization values M(x1), M(x2), . . . along the long magnetic region. As the first magnetization value M(x0) (x=d), for example the magnetization at the front edge of the long magnetic region is considered. The further magnetization values correspond to magnetization distances of x>d. In the example of the security thread 2 with five magnetic regions 22, the magnetization M(x) is as shown in FIG. 6b. For each magnetic region 22 there is generated a peak as a function of the magnetization distance. The two left-hand magnetic regions 22 due to their small distance from the magnet 71 have been partially counter-magnetized to such a strong extent that their magnetization points in a direction opposite to the magnetization direction (M negative). The two right-hand magnetic regions 22 due to their great distance from magnet 71 have only been partially counter-magnetized to a small extent, so that their magnetization still points in the magnetization direction (M positive). Very low magnetization values are measured for the central magnetic region 22. This central magnetic region 22 was thus counter-magnetized approximately with the coercive field strength of the magnetic pigments. The location of the central magnetic region therefore corresponds at least approximately to the target magnetization distance xm at which the magnetization course M(x) has a minimum or a zero crossing (M(xm)=0).

The checking device 3 can automatically determine the target magnetization distance xm with the help of an appropriate signal evaluation of the curve M(x), e.g. by selecting the peak with the lowest height or by interpolation between the two lowest peaks. Where applicable, the (minimum) magnetization value found at the target magnetization distance xm can be compared with a remanence measurement value R of the remanence measurement (e.g. with the maximum of the measured function R(x)) to ensure that its absolute height is actually very low (e.g. below a threshold). This ensures that the counter-magnetization magnetic field at the found magnetization minimum actually corresponds approximately to the coercive field strength. From the target magnetization distance xm determined in this way and with the aid of the magnetic field course K(x), the checking device 3 can then determine the actual coercive field strength Km of the magnetic pigments which is then output at the input and output device 6.

Alternatively, the first derivative of the magnetization course $M'(x)=dM(x)/dm$ according to the coordinate of the magnetization distance x can also be used to determine the searched-for target magnetization distance xm and its lowest peak can be determined, cf. FIG. 6c. Instead of a one-dimensional magnetization course M(x), the measuring device 4 can also measure a two-dimensional distribution of the magnetization M(x, y) and evaluate it with the help of image processing to determine xm. Alternatively, the checking device can also output only the magnetization course M(x), its first derivative M'(x) or a two-dimensional distribution of the magnetization M(x, y) or its first derivative M'(x, y), e.g. as a greyscale image, at the input and output device and the determination of xm can be carried out by the operator, e.g. by setting a corresponding mark at the lowest peak of M(x) or M'(x) or M(x, y) or M'(x, y) at the input and output device 6 with a cursor.

If the measured magnetization course M(x) or M(x, y) does not show a zero crossing or minimum (e.g. because the long magnetic region was not positioned at a corresponding magnetization distance during partial counter-magnetization or has an unusual coercive field strength), the partial counter-magnetization can be carried out again in another region of the magnetizing device 7, in which other magnetization distances and thus other coercive field strengths are achieved for the long magnetic region. The measurement of the magnetization course M(x) or M(x, y) and the evaluation described above is then also carried out again.

If the security thread additionally has magnetic regions of a different coercive field strength, the procedure just described can simply be repeated, whereby the partial counter-magnetization—corresponding to the other coercive field strength—may have to be effected in a different region of the magnetizing device 7. Tor the magnetic regions of different coercive field strength, the operator where applicable specifies separate ROIs on the areal sample. For the magnetic regions of the other coercive field strength, the measurement of the magnetization course M(x) or M(x, y) and its evaluation is carried out analogously to the above.

FIG. 6d shows the orientation of the long magnet magnetic region 2 chosen for the partial counter-magnetization in a variant of the sixth embodiment example. There, the magnetic region 2 does not run parallel to the magnetic field gradient (−x direction), but obliquely thereto at an angle α to the x direction. In addition, the magnetic region here has magnetic pigments throughout along its direction of extension. Here too, however, the long magnetic region 2 extends over such a large portion of the static magnetic field that the magnetic region 2 covers a large number of magnetization distances x0, x1, x2, . . . The magnetization of the magnetic pigments is carried out in the same oblique orientation, by means of drawing the sample through under the crossbar 75. In FIG. 6e the first derivative of the magnetization course M'(x) measured after the first partial counter-magnetization according to the magnetization distance is represented. The magnetization distance x here results from the coordinate p along the (oblique) magnetic region 2 by means of the relation x=d0+p·cos(α). With the aid of the first derivative of FIG. 6e, the searched-for target magnetization distance xm can be determined, which in this case lies at a local minimum of M'(x) (the large peaks of the function M(x) mark the beginning and end of the magnetic region 2 extending throughout).

Seventh Embodiment Example

Figure 7A:
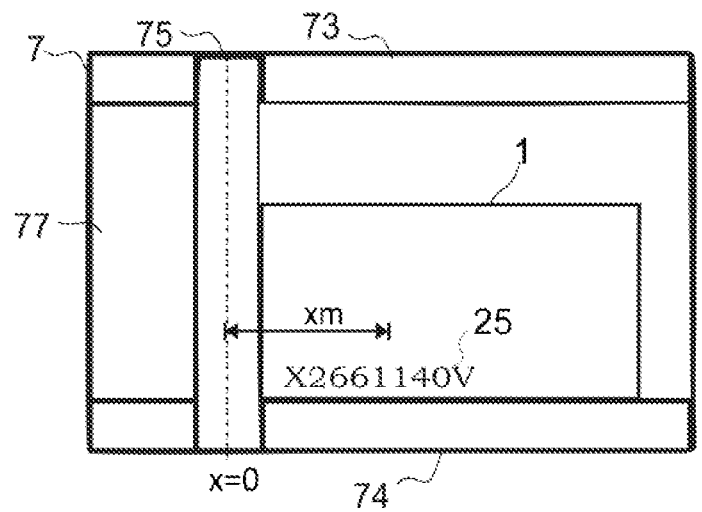

As in the sixth embodiment example, in the seventh embodiment example, too, an unknown coercive field strength of the magnetic pigments of a long magnetic region is determined. In this case, however, the magnetic region is not furnished homogeneously with the magnetic pigment, but is finely structured. As an example, a serial number 25 made of magnetic printing ink as shown in FIG. 7a is considered.

Figure 7B:
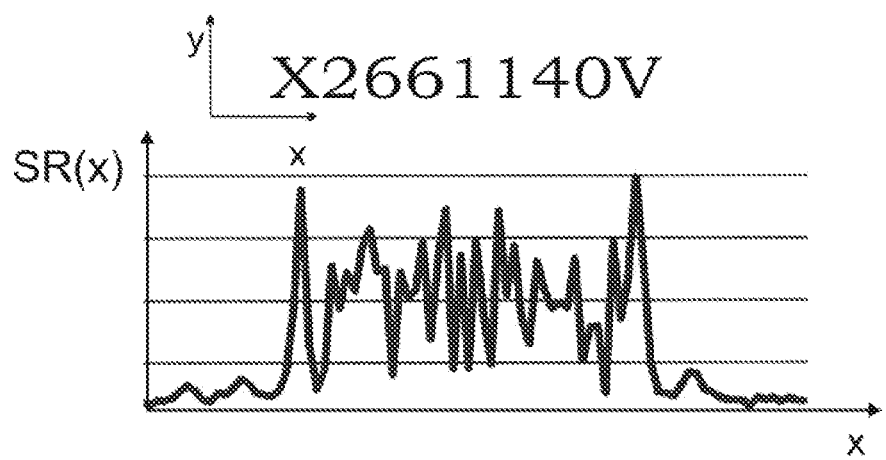

First, the magnetic pigments are magnetized by the operator by means of the magnetizing device 7 or 7' until the saturation of their magnetization, as described above. Subsequently, the course of the remanent magnetization R(x) of the magnetized magnetic pigments along the distance coordinate x on the sample can be measured by means of the measuring device 4. FIG. 7b shows the standard deviation SR(x) of the remanent magnetization R(x) in the y direction (i.e. the standard deviation calculated perpendicular to the serial number direction). In the region of the serial number, this shows modulations extending throughout which are due to the fine structure of the serial number.

For the partial counter-magnetization, the sample 1 is placed on the magnetizing device 7 in such a way that the magnetic serial number runs parallel, antiparallel or oblique to the magnetic field gradient, e.g. analogous to FIG. 6a or FIG. 6d. Due to this orientation of the serial number, the magnetic pigments located in different portions of the serial number are counter-magnetized to different degrees.

Figure 7C:
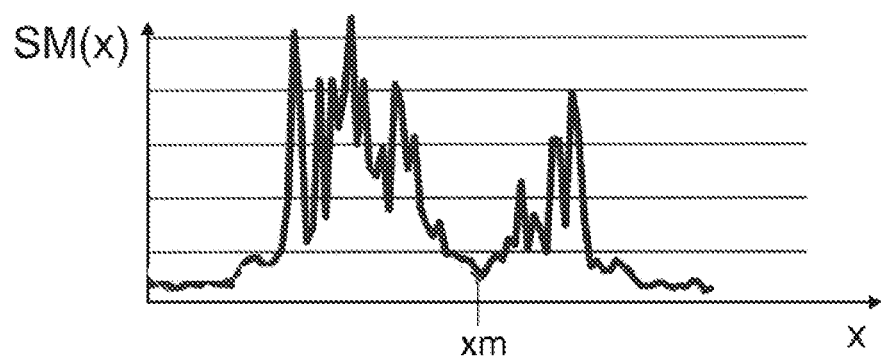

Subsequently, the magnetization values of the partially counter-magnetized magnetic pigments along the distance coordinate x on the sample are measured by means of the measuring device 4 with the magnetization course M(x), and the standard deviation SM(x) of the magnetization M(x) in the y direction is determined again, cf. FIG. 7c. The standard deviation SM(x) does not show a modulation extending throughout, but the modulation in the region of the position xm is minimal or shows an interruption, while the standard deviation SM also assumes relatively low values. The weak modulation at xm and the low values SM indicate that at this position xm the serial number has a low magnetization, i.e. the partial counter-magnetization was carried out with approximately the coercive field strength.

The checking device 3 can automatically determine the target magnetization distance xm with the help of a corresponding signal evaluation of the curve SM(x). Where applicable, upon the evaluation, also the curve SR(x) can be used for the comparison. From the target magnetization distance xm determined in this way and with the aid of the magnetic field course K(x), the checking device 3 can then determine the actual coercive field strength Km of the magnetic pigments which is then output at the input and output device 6.

First Embodiment of the Magnetizing Device

Figure 5A:
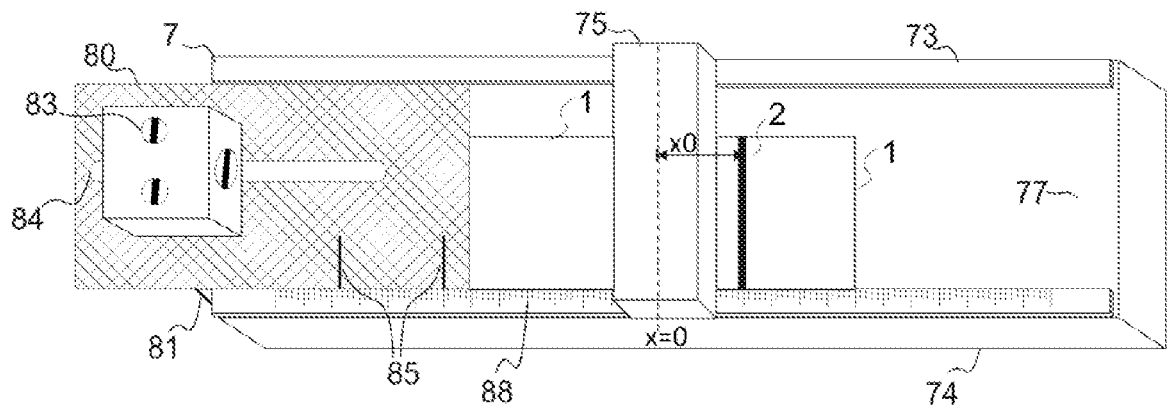

The magnetizing device 7 shown in FIG. 5a is based on that of FIG. 3a, but additionally has a scale 88 which can be read by an operator and from which he can read a measure of the distance between the magnetic pigments and the magnet 71 of the magnetizing device, in particular the magnetization distance x0, x1, x2, . . . . The scale extends e.g. along one of the (or both) lateral guides 74, 75. If the position of the magnetic pigments on the sample is visible to the operator, he can read from the scale directly and with millimetre accuracy the position of the magnetic pigments and thus the magnetization distance.

If the operator does not know the position of the magnetic pigments on the sample, he can alternatively also read from the scale the position of the sample front edge d0 or the position of the sample rear edge, from which—with the aid of the distance p0 of the magnetic pigments from the front or rear edge of the sample—the magnetization distance of the magnetic pigments x0, x1, x2, . . . can be determined, cf. FIG. 3c. Several values for p0 for various samples can be stored in the checking device 3 so that it can carry out an automatic conversion of the front edge positions d0, d1, d2, which can be easily determined by the operator, into the magnetization distance x0, x1, x2, . . . or vice versa.

For the magnetizing device shown in FIG. 5a, a shiftable mechanical stop 80 may, where applicable additionally, be provided, which facilitates the positioning of the areal sample 1 on the magnetizing device 7. The mechanical stop 80 preferably extends over the entire width of the magnetizing area 77 and has such a small thickness that it can be pushed into the gap 76 between the crossbar 75 and the magnetizing area 77 where applicable, e.g. if the front edge of the sample 1 is to be positioned under the crossbar. Preferably, it is removable from the magnetizing device 7. For particular cases, markings 85 on the mechanical stop are also useful, the position of which along the scale can be read as an alternative to the position of the front edge of the sample or of the stop, e.g. if the front edge is covered by the crossbar 75.

The mechanical stop 80 has, where applicable, a vertical plate 81 on its underside, the position of which can be varied along the stop 80. To change the position, this plate 81 is moved along a slot hole 84 with the help of one or several adjusting screws 83. A coarse adjustment and a fine adjustment can be provided, which enables a positioning accurate to at least 0.5 mm. The vertical plate 81 prevents the mechanical stop 80 from slipping to one side during the partial counter-magnetization of the magnetic pigments.

Second Embodiment of the Magnetizing Device

Figure 5B:
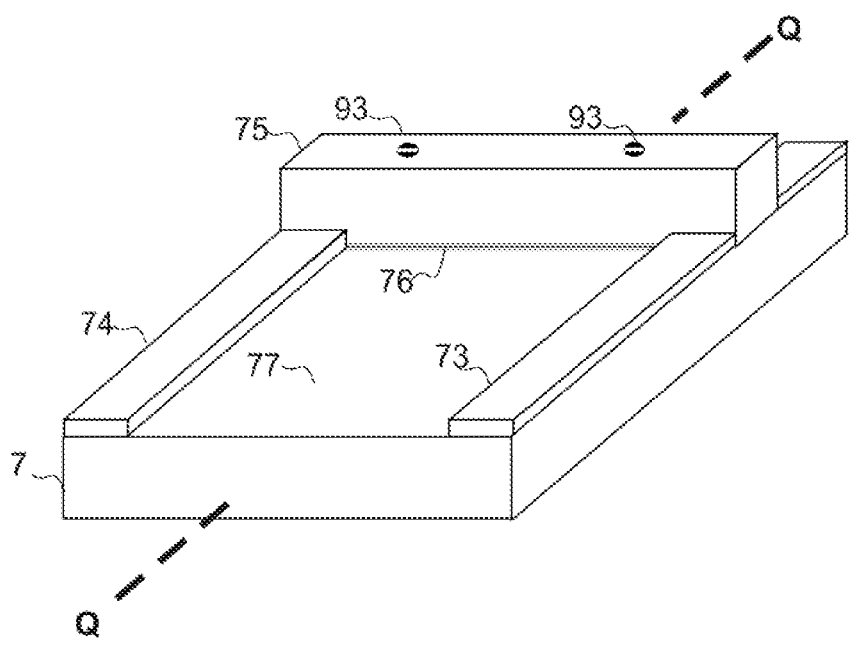
Figure 5C:
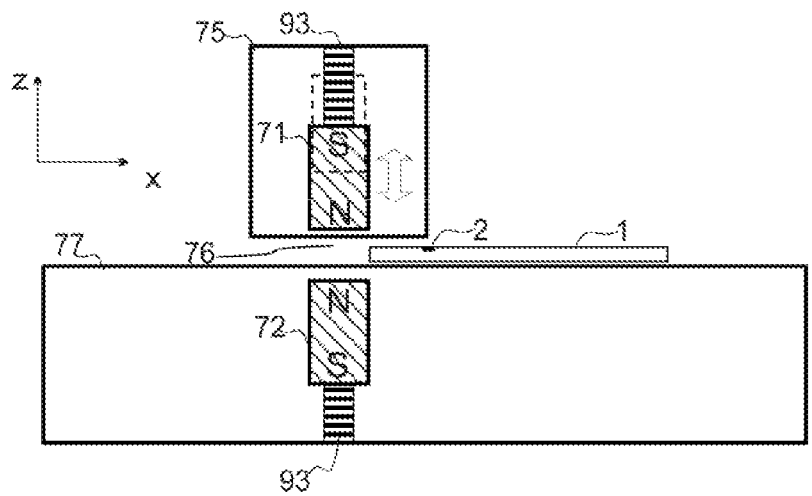

FIG. 5*b,c* shows another magnetizing device 7 in which the position of the upper magnet 71 is vertically shiftable, cf. the arrow pointing in the z direction in FIG. 5*c*. FIG. 5*c* shows a section along the line Q-Q in FIG. 5*b*. The position of the lower magnet 72 can also be vertically shiftable. The magnets 71, 72 extend in the y direction over the entire width of the magnetizing area 77. Where applicable, both magnets 71, 72 (mechanically coupled) are shifted such that they always have the same z distance to the magnetizing area 77, so that the static magnetic field present in the magnetizing area 77 points in the x direction if possible.

The opposing magnets 71, 72 are each located e.g. in a shaft in which they are mounted to float. The position is determined by two adjusting screws 93 which press on the respective magnets 71, 72 from above and below, respectively. The adjusting screws 93 are furnished e.g. with a readable scale from which the operator can read a measure of the magnetization distance of the magnetic pigments. Preferably, a discrete grid is specified for the z positions of the magnets 71, 72, which can be adjusted by the operator, so that the number of magnetic field courses to be respectively stored therefor remains manageable. The fixing of the magnets can be effected by the repulsive forces alone. To avoid canting, the shafts are lined with slippery material. A thin steel plate may be attached between adjusting screw and magnet. Alternatively, also the entire crossbar 75 can be moved relative to the magnetizing area 77 and the magnets 71, 72 remain stationary in the shaft. Alternatively, the z movement of the magnet 71 or of both magnets 72 can also be effected with the help of a laterally movable shift profile, the lateral movement of which causes a z-movement of the magnets 71, 72. A readable scale can be attached to the shift profile, which provides a measure of the magnetization distance.

For the partial counter-magnetization, the sample 1 is preferably positioned such that the magnetic region 2 with the magnetic pigments does not exactly lie under the magnet 71, but slightly offset in the x direction, e.g. under the right-hand edge of the crossbar 75, cf. FIG. 5*c*. This is advantageous compared to the positioning directly under the magnet 71, as the x component of the static magnetic field is relatively low there. Subsequently, the adjusting screw 93 is moved until the desired magnetization distance is achieved. For the renewed partial counter-magnetizations carried out where applicable, the magnetic pigments can be brought to the same x position (e.g. under the right margin of the crossbar 75) and only the adjusting screw 93, i.e. the z position of the magnet 71, can be shifted accordingly. Alternatively, the z position of the magnet 71, having been adjusted at the beginning, can remain unchanged and various x positions of the magnetic pigments can be chosen for the partial counter-magnetizations.

The magnetic field course K(x) stored in the checking device 3 indicates the magnetic field strength as a function of the magnetization distance x. However, in the case of the magnetizing device of FIG. 5*b,c*, not only the x position of the magnetic pigments along the x direction but also the z position of the magnet 71 (and where applicable also that of the magnet 72) to be varied are included in the magnetization distance x. The magnetization distance x0, x1, x2 of the magnetic pigments thus results from the z position of the adjusting screws 93 and the chosen x position of the magnetic pigments. In the case of a magnetizing device that has a magnet that can be shifted in the z direction, the magnetic field course K is therefore preferably stored in the checking device not only as a function of the x position, but also as a function of the z position of the magnet. This can also be a function K(x, z). Or several magnetic field courses K(z) for several discrete x positions of the magnetic pigments or several magnetic field courses K(x) for several discrete z positions of the magnet can be stored in the checking device 3. These stored magnetic field courses can be determined empirically prior to the magnetic pigment check.

Alternatively, for the partial counter-magnetization, the sample 1 can also be drawn through the magnetizing device—as during the magnetization—in order to achieve the desired partial counter-magnetization. Here, the magnetic field extreme value lying on the negative x axis at x=−f (cf. FIG. 4*b*) is decisive for the resulting magnetization. For example, for magnetizing, the sample can be drawn through the magnetizing device 7 a first time. For the first partial counter-magnetization, the sample is rotated by 180° (front and rear edges reversed), drawn through the magnetizing device 7 a second time and then a first magnetization value is measured. Subsequently, the z position of the magnet 71 is shifted downward, the sample is drawn through the magnetizing device 7 a third time in the same orientation and a second magnetization value is measured. From the two magnetization values, the z position of the magnet at which a magnetization value of zero is to be expected can be determined, e.g. by extrapolation or interpolation, and from this—with the aid of the magnetic field course K(−f, z) valid for the position x=−f—the associated coercive field strength of the sample can be determined.

The invention claimed is:

1. An arrangement for magnetizing an areal sample and for checking coercive field strength of magnetic pigments of the areal sample, the arrangement comprising:
    an apparatus comprising:
       a measuring device; and
       a checking device connected to the measuring device;
       wherein the magnetic pigments of the areal sample have been magnetized in a magnetization direction until saturation of their magnetization and have been partially counter-magnetized by a magnet of a magnetization device in a direction opposite to the magnetization direction by a first magnetization field strength provided by the magnetizing device in a first partial counter-magnetization,
       wherein the measuring device is arranged for
          carrying out a first measurement of a first magnetization value (M(x0), M(x0')) of the magnetic pigments partially counter-magnetized after the first partial counter-magnetization,
          carrying out the first measurement such that the magnetic pigments are located outside the static magnetic field of the magnetizing device during the first measurement,
          transmitting the first magnetization value of the partially counter-magnetized magnetic pigments measured in the first measurement to the checking device, and
       wherein the checking device connected to the measuring device is arranged for
          checking the first magnetization value of the partially counter-magnetized magnetic pigments for ascertaining a check result which relates to the coercive field strength of the magnetic pigments, and transmitting the check result relating to the coercive field strength of the magnetic pigments to an output device connected to the checking device,
wherein in the checking device a magnetic field course (K(x)) of the magnetizing device is stored or the checking device is connected to another device in which a magnetic field course (K(x)) of the magnetizing device is stored, and wherein the checking device is in particular arranged for at least one of the following:
using the magnetic field course (K (x)) of the magnetizing device stored in the checking device or stored in the other device to ascertain the check result relating to the coercive field strength of the magnetic pigments, and
using the magnetic field course of the magnetizing device to ascertain at least one of:
(i) a first magnetization distance (x0) which is to be chosen between the magnetic pigments and the magnet of the magnetization device for the first partial counter-magnetization of the magnetic pigments, and
(ii) a further magnetization distance (x1), which is to be chosen between the magnetic pigments and the magnet of the magnetization device for a renewed partial counter-magnetization of the magnetic pigments, wherein for the renewed partial counter-magnetization the magnetic pigments of the areal sample and the magnet are moved relative to each other toward each other until the magnetic pigments are positioned at the further magnetization distance (x1) from the magnet, at which the magnetic field strength of the static magnetic field is greater or smaller than the first magnetization field strength,
the arrangement further comprising:
a magnetizing device which has a magnetizing area for receiving the areal sample and at least one magnet which provides a static magnetic field which is arranged for partially counter-magnetizing the magnetic pigments of the areal sample,
wherein the magnetizing device is arranged such that the areal sample placed on the magnetizing area and the at least one magnet, for a first partial counter-magnetization of the magnetic pigments, are movable relative to each other toward each other until the magnetic pigments are positioned at a first magnetization distance (x0) from the at least one magnet, at which the static magnetic field has a first magnetization field strength.

2. The arrangement according to claim 1, wherein the at least one magnet is arranged such that a gap is formed between the magnetizing area and the at least one magnet, into which the areal sample can be introduced for magnetizing its magnetic pigments, the gap perpendicular to the magnetizing area being greater than a thickness of the areal sample.

3. The arrangement according to claim 1, wherein the magnetizing area has an entry side which—viewed along a predetermined direction of movement of the areal sample—is arranged before the at least one magnet, and has an exit side which—viewed along the predetermined direction of movement of the areal sample—is arranged after the at least one magnet, wherein the magnetizing area of the magnetizing device has at least one of the following configurations:
the magnetizing area of the magnetizing device—viewed along the predetermined direction of movement extends at least over a length of the areal sample, in particular over at least 10 cm, on at least one of the entry side and the exit side, and
the magnetizing area of the magnetizing device is limited on one side or both sides by a guide which extends along the predetermined direction of movement of the areal sample.

4. The arrangement according to claim 1, wherein the magnetizing device has at least one magnet whose magnetic north pole or whose magnetic south pole with its end face faces the magnetizing area.

5. The arrangement according to claim 1, wherein the magnetic field course (K(x)) of the magnetizing device stored in the checking device or in the other device indicates the magnetic field strength present on the magnetizing area as a function of the position along the magnetizing area, in particular parallel or anti-parallel to a magnetic field gradient of the static magnetic field.

6. The arrangement according to claim 1, wherein the magnetizing device has a shifting device with the help of which the operator of the magnetizing device can adjust the distance of at least one of the magnets from the magnetizing area, and that the magnetic field course (K(x)) of the magnetizing device stored in the checking device or in the other device indicates the magnetic field strength present on the magnetizing area in particular as a function of the position (z) of the at least one magnet perpendicular to the magnetizing area.

7. The arrangement according to claim 1, wherein the magnetic pigments are positioned at the first magnetization distance (x0) from the magnet in the static magnetic field for a first partial counter-magnetization by at least one of the following:
moving the areal sample toward the magnet;
moving the magnet toward the areal sample; and
moving both the areal sample and the magnet toward each other.

8. The arrangement according to claim 1, wherein the checking device is arranged for
receiving an operator's specification which relates to a requested coercive field strength (K0') to be verified with the checking device and,
ascertaining on a basis of the operator's specification, with aid of the magnetic field course (K(x)) of the magnetizing device, the first magnetization distance (x0') which is to be chosen between the magnetic pigments and the magnet for the first partial counter-magnetization, and
transmitting the first magnetization distance (x0') to an output device connected to the checking device, which output device is arranged to output the first magnetization distance for the operator of the magnetizing device.

9. The arrangement according to claim 8, wherein the checking device is arranged for at least one of the following:
checking, when checking the first magnetization value of the partially counter-magnetized magnetic pigments, whether the first magnetization value (M(x0)) corresponds to a magnetization of zero, and
checking whether the first magnetization value (M(x0)) lies in a magnetization acceptance region (A) which lies around a magnetization of zero and which, according to a hysteresis curve of the magnetic pigments, corresponds to a requested coercivity region (K'), and, if yes, transmitting to the output device a confirmation for at least one of the following:
the magnetic pigments have a specified requested coercive field strength (K0') and the coercive field strength of the magnetic pigments lies in the specified requested coercivity region (K').

10. The arrangement according to claim 8, wherein the check result ascertained upon checking, which relates to the coercive field strength of the magnetic pigments, comprises a confirmation or a denial of at least one of the following:
whether the magnetic pigments have a specified requested coercive field strength (K0') and
whether their coercive field strength lies within a requested coercivity region (K') including the requested coercive field strength.

11. The arrangement according to claim 1, wherein the check result ascertained upon checking, which relates to the coercive field strength of the magnetic pigments, comprises a value for the coercive field strength of the magnetic pigments.

12. The arrangement according to claim 11, wherein the checking device is arranged to receive an operator's specification which relates to a coercivity region (C) to be examined with the checking device and to ascertain on a basis of the operator's specification, with aid of the magnetic field course (K(x)) of the magnetizing device, the first (x0) magnetization distance and at least one further magnetization distance (x1, x2) which is to be chosen between the magnetic pigments and the magnet for the first partial counter-magnetization or for the renewed partial counter-magnetization, and to transmit the respective first and further magnetization distance (x1, x2) to the output device connected to the checking device, which output device is arranged to output the respective first magnetization distance (x0) and the at least one further magnetization distance (x1, x2) for the operator of the magnetizing device.

13. The arrangement according to claim 11, wherein the checking device is arranged for
determining, with aid of at least two of the further magnetization values (M(x1), M(x2)) or with aid of the first magnetization value M(x0) and at least one of the further magnetization values (M(x1)), a target magnetization distance (xm) at which the magnetization as a function of a magnetization distance (x) has a zero crossing (M(xm)=0) or at least assumes a minimum, and
determining the coercive field strength (Km) of the magnetic pigments from the target magnetization distance (xm) with the aid of the magnetic field course (K(x)), and
transmitting the coercive field strength (Km) of the magnetic pigments to an output device connected to the checking device, which output device is arranged to output the coercive field strength (Km) of the magnetic pigments,
wherein the checking device in particular is arranged to determine the target magnetization distance (xm), at which magnetization M(x) as a function0 of the magnetization distance (x) has the zero crossing (M(xm) =0), by fitting or extrapolating or interpolating the first magnetization value M(x0) and at least one of the further magnetization values (M(x1)), or by fitting or extrapolating or interpolating at least two of the further magnetization values (M(x1), M(x2)).

14. The arrangement according to claim 11, wherein the checking device is arranged to automatically determine the further magnetization distance (x1) on a basis of the first magnetization value (M(x0)) transmitted by the measuring device, wherein the further magnetization distance (x1) is chosen closer to the magnet of the magnetizing device than the first magnetization distance (x0), if the magnetization of the magnetic pigments still points in the magnetization direction after their first partial counter-magnetization, and
is chosen further away from the magnet of the magnetizing device than the first magnetization distance (x0), if the magnetization of the magnetic pigments points opposite to the magnetization direction after their first partial counter-magnetization, and
the checking device is arranged to transmit the further magnetization distance (x1) to an/the output device which is arranged to prompt an operator to effect the renewed partial counter-magnetization of the magnetic pigments at the further magnetization distance (x1) and to effect a renewed measurement of the partially counter-magnetized magnetic pigments, in order to determine the further magnetization value (M(x1)) by means of the measuring device.

15. The arrangement according to claim 1, wherein the measuring device has a receiving means for receiving the areal sample, which is arranged to receive the areal sample during the first measurement such that the areal sample is located outside the static magnetic field of the magnetizing device during the first measurement.

16. The arrangement according to claim 1, wherein the measuring device is further arranged for carrying out at least one further measurement for measuring at least one further magnetization value (M(x1)) of the magnetic pigments partially counter-magnetized in a renewed partial counter-magnetization, in which these were partially counter-magnetized with a further magnetization field strength opposite to the magnetization direction, which is greater or smaller than the first magnetization field strength;
wherein the measuring device is further arranged for carrying out the respective further measurement such that the magnetic pigments are located outside the static magnetic field of the magnetizing device during the respective further measurement;
wherein the measuring device is further arranged for transmitting the at least one further magnetization value measured in the at least one further measurement to the checking device;
wherein the checking device connected to the measuring device is further arranged for checking the at least one further magnetization value of the partially counter-magnetized magnetic pigments for ascertaining a check result which relates to the coercive field strength of the magnetic pigments.

17. The arrangement according to claim 1, wherein the magnetizing device has a scale readable by an operator, from which the operator can read a measure of the magnetization distance between the magnetic pigments and the magnet of the magnetizing device.

18. The arrangement according to claim 17, wherein the scale is part of a guide of the magnetizing device limiting a magnetizing area or a shifting device of the magnetizing device.

19. The arrangement according to claim 1, wherein the magnetizing device has a crossbar arranged at a distance (z) above the magnetizing area, wherein distance between the crossbar and the magnetizing area is at least a thickness of the areal sample.

* * * * *